US011356906B1

(12) United States Patent
Marupaduga

(10) Patent No.: US 11,356,906 B1
(45) Date of Patent: Jun. 7, 2022

(54) ADDITION THRESHOLDS FOR WIRELESS ACCESS NODES BASED ON FREQUENCY CHANNEL SIZE

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 67 days.

(21) Appl. No.: 17/066,920

(22) Filed: Oct. 9, 2020

(51) Int. Cl.
*H04W 36/00* (2009.01)
*H04W 36/08* (2009.01)
*H04W 88/06* (2009.01)

(52) U.S. Cl.
CPC ... *H04W 36/0058* (2018.08); *H04W 36/0069* (2018.08); *H04W 36/0085* (2018.08); *H04W 36/08* (2013.01); *H04W 36/0083* (2013.01); *H04W 88/06* (2013.01)

(58) Field of Classification Search
CPC .......... H04W 36/058; H04W 36/0085; H04W 36/0083; H04W 36/08; H04W 36/06; H04W 88/06
See application file for complete search history.

(56) References Cited

U.S. PATENT DOCUMENTS

| | | | |
|---|---|---|---|
| 8,908,560 B2 | 12/2014 | Maeda et al. | |
| 9,167,448 B2 | 10/2015 | Nagata et al. | |
| 9,179,349 B2 | 11/2015 | Nagata et al. | |
| 9,474,067 B2 | 10/2016 | Damnjanovic et al. | |
| 9,918,264 B1* | 3/2018 | Bitra | H04W 64/00 |
| 10,555,329 B2 | 2/2020 | Golitschek Edler Von Elbwart et al. | |
| 2005/0271009 A1* | 12/2005 | Shirakabe | H04W 16/10 370/329 |
| 2014/0200001 A1 | 7/2014 | Song et al. | |
| 2015/0139008 A1* | 5/2015 | Meilhac | H04L 43/0882 370/252 |
| 2017/0208516 A1 | 7/2017 | Kubota et al. | |
| 2018/0234869 A1* | 8/2018 | Sirotkin | H04W 24/10 |
| 2019/0261197 A1* | 8/2019 | Bellamkonda | H04W 16/18 |
| 2021/0165441 A1* | 6/2021 | Kim | G06F 1/08 |

* cited by examiner

Primary Examiner — Barry W Taylor

(57) ABSTRACT

A primary access node adds a secondary access node to deliver wireless communication service and comprises a radio and baseband circuitry. The radio receives a measurement report from a User Equipment (UE) and transfers the measurement report to the baseband circuitry. The baseband circuitry determines a frequency channel size for the secondary access node and an add threshold for the secondary access node based on the frequency channel size. The baseband circuitry determines an add value for the secondary access node based on the measurement report. When the add value is greater than the add threshold, the baseband circuitry signals the secondary access node to serve the UE and transfers user signaling for the UE to the radio. The radio wirelessly transfers the user signaling to the UE. The UE attaches to the secondary access node and the secondary access node delivers the wireless communication service to the UE.

20 Claims, 12 Drawing Sheets

12

ADDITION THRESHOLDS FOR WIRELESS ACCESS NODES BASED ON FREQUENCY CHANNEL SIZE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN). In some examples, both LTE and 5GNR networks serve the same wireless user device at the same time with an integrated data service called dual-connectivity. A wireless access node that provides dual connectivity simultaneously serves a single user device over parallel wireless links.

An Evolved Universal Terrestrial Radio Access Network Dual Connectivity (EN-DC) node comprises both a primary access node and one or more secondary access nodes. An EN-DC user device initially attaches to the primary access node in the EN-DC node. The primary access node transfers measurement instructions to the EN-DC user device that direct the EN-DC user device to measure signal strength for the secondary access nodes. The EN-DC user device receives the measurement instructions and measures the signal strength of the secondary access nodes. The EN-DN user device reports the signal strength for the secondary access nodes to the primary access node.

The primary access node determines if the secondary access nodes should be used to serve the EN-DC user device based on the reported signal strength. To determine if the secondary access nodes should be used, the primary access node compares received signal strengths for the secondary access nodes at the EN-DC user device to an addition threshold that is referred to as "B 1". When the received signal strengths exceed the addition threshold, the primary access node adds the secondary access nodes. The secondary access nodes exchange user data with EN-DC user device. The primary access node does not select the addition thresholds for the secondary access nodes based on performance characteristics of the secondary access nodes. For example, the primary access node does not select addition thresholds for the secondary access nodes based on the frequency channel size of the secondary access nodes.

Unfortunately, the wireless access nodes do not effectively and efficiently select addition thresholds.

TECHNICAL OVERVIEW

A primary access node adds a secondary access node to deliver wireless communication service. The primary access node comprises a radio and baseband circuitry. The radio wirelessly receives a measurement report from a User Equipment (UE) that characterizes a radio metric for the secondary access node. The radio transfers the measurement report to the baseband circuitry. The baseband circuitry determines a frequency channel size for the secondary access node and determines an add threshold for the secondary access node based on the frequency channel size for the secondary access node. The baseband circuitry processes the measurement report and responsively determines an add value for the secondary access node based on the radio metric in the measurement report. The baseband circuitry determines when the add value is greater than the add threshold. When the add value is greater than the add threshold, the baseband circuitry transfers network signaling to the secondary access node to serve the UE and transfers user signaling to the radio. The radio wirelessly transfers the user signaling to the UE to attach to the secondary access node. The UE attaches to the secondary access node responsive to the user signaling and the secondary access node delivers the wireless communication service to the UE responsive to the network signaling.

DETAILED DESCRIPTION

Figure 1:
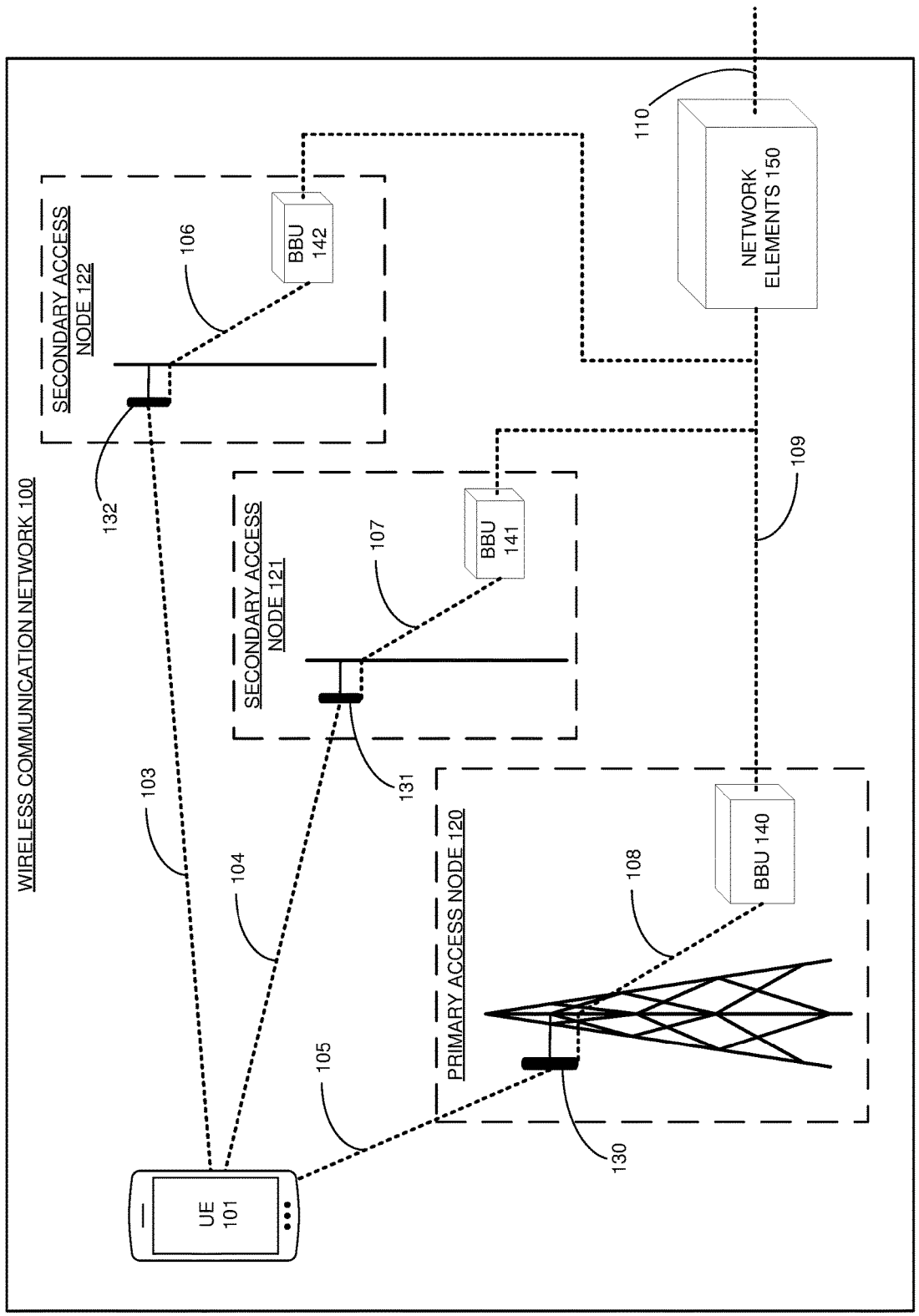
FIG. 1 illustrates a wireless communications network to serve a wireless User Equipment (UE) with a wireless communication service over multiple wireless links based on frequency channel size.

FIG. 1 illustrates wireless communication network 100 to serve wireless User Equipment (UE) 101 with a wireless communication service over multiple wireless links based on frequency channel size. Wireless communication network 100 comprises wireless UE 101, links 103-110, primary access node 120, secondary access nodes 121-122, and network elements 150. Primary access node 120 comprises radio 130 and Baseband Unit (BBU) 140. Secondary access node 121 comprises radio 131 and BBU 141. Secondary access node 122 comprises radio 132 and BBU 142.

A frequency channel comprises a segment of a frequency band that is used for wireless communication between access nodes and UEs. Frequency channel size is the width of the frequency channel and is typically measured in Megahertz (MHz). For example, a frequency channel that is 100 MHz wide would have a frequency channel size of 20 MHz. BBU 140 determines frequency channel sizes for secondary access nodes 121-122. BBU 140 may store frequency channel sizes for secondary access nodes 121-122, request frequency channels sizes from secondary access nodes 121-122, and/or implement some other technique to determine frequency channel sizes for secondary access nodes 121-122.

Various examples of network operation and configuration are described herein. In some examples, UE 101 wirelessly attaches to radio 130. Radio 130 wirelessly exchanges user data with UE 101. Radio 130 exchanges the user data with BBU 140. BBU 140 exchanges the user data with network elements 150. Network elements 150 exchange the user data with external systems. UE 101 exchanges user signaling with radio 130 to attach to secondary access nodes 121-122. Radio 130 exchanges the user signaling with BBU 140. BBU 140 directs UE 101 to measure a signal metric for secondary access nodes 121-122 over radio 130. Exemplary signal metrics comprise Received Signal Received Power (RSRP), Received Signal Received Quality (RSRQ), Received Signal Code Power (RSCP), Energy per Chip over Noise Spectral Density (Ec/No), Receiver Level (RxLev), and/or some other radio measurement. In some examples, BBU 140 directs UE 101 to measure multiple signal metrics for secondary access nodes 121-122.

UE 101 measures the signal metric for secondary access nodes 121-122. UE 101 transfers measurement reports to radio 130 that characterizes the signal metric for secondary access nodes 121-122. Radio 130 transfers the measurement reports to BBU 140. BBU 140 determines the frequency channel size for secondary access node 121 and the frequency channel size for secondary access node 122. BBU determines an add threshold for secondary access node 121 based on the frequency channel size for secondary access node 121. Likewise, BBU 140 determines an add threshold for secondary access node 122 based on the frequency channel size of secondary access node 122. For example, BBU 140 may implement a data structure that correlates frequency channel sizes to add thresholds to select add thresholds for secondary access nodes 121-122. BBU 140 determines an add value for secondary access node 121 based on the signal metric for secondary access node 121. BBU 140 determines an add value for secondary access node 122 based on the add value for secondary access node 122.

BBU 140 determines when the add value for secondary access node 121 is greater than the add threshold for secondary access node 121 and when the add value for secondary access nodes 122 is greater than the add threshold for secondary access node 122. When the add values are greater than the add thresholds, BBU 140 transfers network signaling to secondary access nodes 121-122 to serve UE 101. BBU 140 exchanges user signaling with radio 130 that directs UE 101 to attach to secondary access nodes 121-122. Radio 130 wirelessly transfers the user signaling to UE 101 to attach to secondary access nodes 121-122. UE 101 attaches to secondary access nodes 121-122. Secondary access nodes 121-122 wirelessly exchange user data for the wireless communication service with UE 101. Secondary access nodes 121-122 exchange the user data with network elements 150. Network elements 150 exchange the user data with external systems.

UEs 101 and radios 130-132 comprise antennas, amplifiers, filters, modulation, analog/digital interfaces, microprocessors, software, memories, transceivers, bus circuitry, and the like. Although UE 101 is depicted as a smartphone, UEs 101 might instead comprise a computer, robot, vehicle, or other data appliance with wireless communication circuitry. Radios 130-132 are mounted on a tower, but radios 130-132 may use other mounting structures or no mounting structure at all. Radios 130-132 are mounted on separate towers, but radios 130-132 may be collocated on the same mounting structure.

BBUs 140-142 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Access nodes 120-122 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, Long Term Evolution (LTE) eNodeBs, WIFI hotspots, Low-Power Wide Area Network (LP-WAN) nodes, and/or some other wireless network apparatus. Network elements 150 comprise User Plane Functions (UPFs), Access and Mobility Management Function (AMFs), System Architecture Evolution Gateways (SAE GWs), Mobility Management Entities (MMEs), and/or some other network apparatus.

Wireless links 103-105 use over-the-air air electromagnetic frequencies in the low-band, mid-band, high-band, or some other portion of the electromagnetic spectrum. Wireless links 103-105 use protocols like 5GNR, LTE, MMW, Institute of Electrical and Electronic Engineers (IEEE) 802.11 (WIFI), LP-WAN, and/or some other format of wireless protocol. Links 106-110 use metal, glass, air, or some other media. Links 106-110 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, interprocessor communication, bus interfaces, and/or some other data communication protocols. Links 103-110 may comprise intermediate network elements like relays, routers, and controllers.

Figure 2:
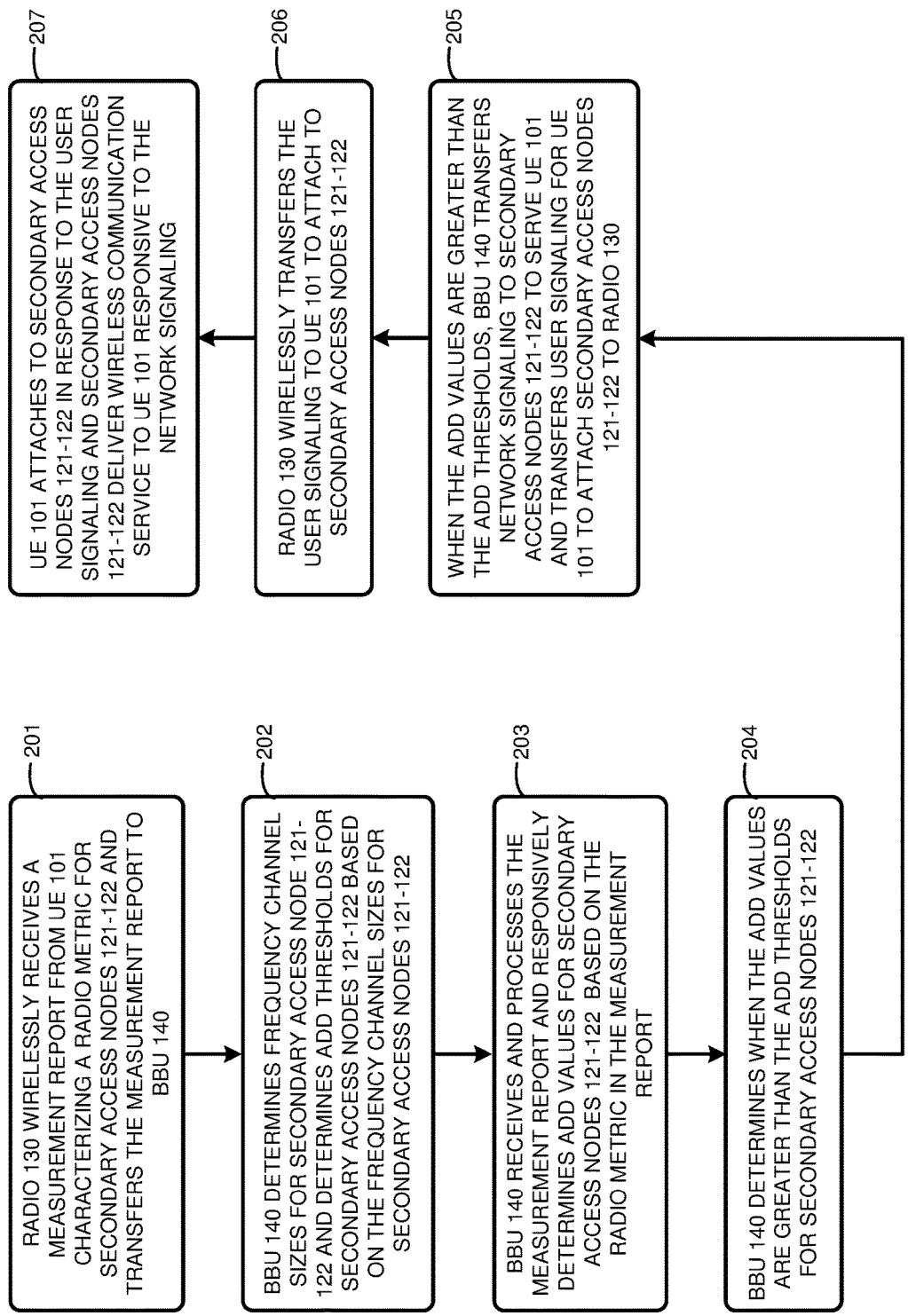
FIG. 2 illustrates an exemplary operation of the wireless communication network to serve the wireless UE over multiple wireless links based on the frequency channel size.

FIG. 2 illustrates an exemplary operation of wireless communication network 100 to serve wireless UE 101 with a wireless communication service over multiple wireless links based on frequency channel size. The exemplary operation of wireless communication network 100 could vary in other examples. Radio 130 wirelessly receives a measurement report from UE 101 that characterizes a radio metric for secondary access nodes 121-122 and transfers the measurement report to BBU 140 (201). BBU 140 determines frequency channel sizes for secondary access nodes 121-122 and determines add thresholds for secondary access nodes 121-122 based on the frequency channel sizes for secondary access nodes 121-122 (202). For example, BBU 140 may select a low add threshold for secondary access node 121 when the frequency channel size for secondary access node 121 is large. Conversely, BBU 140 may select a high add threshold for secondary access node 122 when the frequency channel size for secondary access node 122 is small. BBU 140 receives and processes the measurement report and responsively determines add values for secondary access nodes 121-122 based on the radio metric in the measurement report (203).

BBU 140 determines when the add values are greater than the add thresholds for secondary access nodes 121-122 (204). When the add values are greater than the add thresholds, BBU 140 transfers network signaling to secondary access nodes 121-122 to serve UE 101 and transfers user signaling for UE 101 to attach to secondary access nodes 121-122 to radio 130 (205). Radio 130 wirelessly transfers the user signaling to UE 101 to attach to secondary access nodes 121-122 (206). UE 101 attaches to secondary access nodes 121-122 in response to the user signaling and secondary access nodes 121-122 deliver wireless communication service to UE 101 responsive to the network signaling (207).

Figure 3:
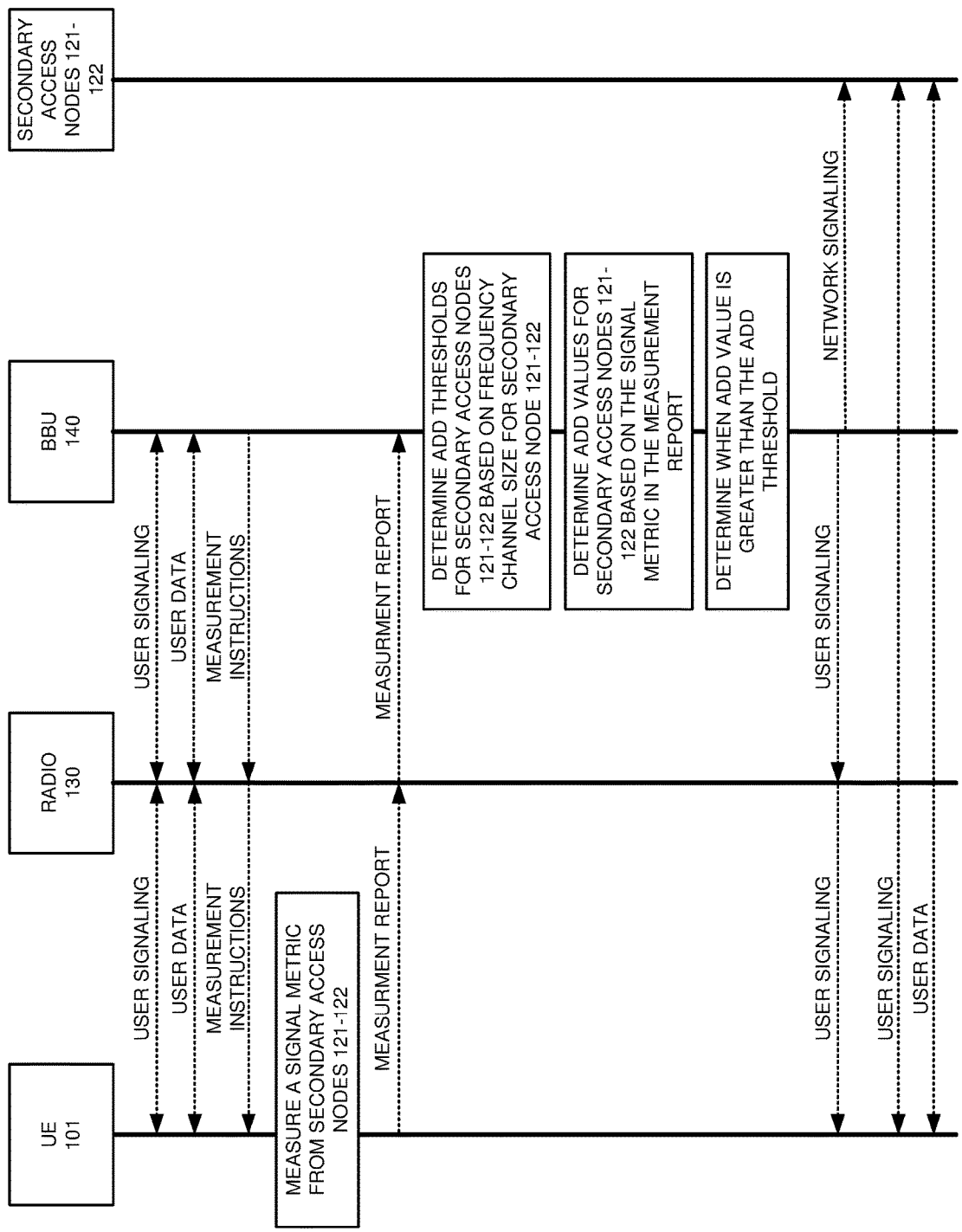
FIG. 3 illustrates an exemplary operation of the wireless communication network to serve the wireless UE over multiple wireless links based on the frequency channel size.

FIG. 3 illustrates an exemplary operation of wireless communication network 100 to serve UE 101 with wireless communication service over multiple wireless links based on frequency channel size. The exemplary operation of wireless communication network 100 could vary in other examples. In this example, frequency channel size is used to determine add thresholds for adding secondary access nodes to enable duel connectivity for a UE. UE 101 wirelessly exchanges user signaling to attach to BBU 140 with radio 130. Radio 130 exchanges the user signaling with BBU 140. UE 101 attaches and BBU 140 exchanges user data with radio 130. Radio 130 wirelessly exchanges the user data with UE 101.

BBU 140 transfers measurement instructions to UE 101 over radio 130 directing UE 101 to measure a signal metric for secondary access nodes 121-122. For example, the measurement instructions may direct UE 101 to measure RSRP for secondary access nodes 121-122. UE 101 wirelessly receives the measurement instructions and responsively measures the signal metric for secondary access nodes 121-122. UE 101 generates and wirelessly transfers a measurement report that characterizes the signal metric for secondary access nodes 121-122 to radio 130. Radio 130 transfers the measurement report to BBU 140. BBU determines frequency channel sizes for secondary access nodes 121-122. For example, BBU 140 may store the frequency channel sizes, request frequency channel size information from secondary access nodes 121-122, receive frequency channel size information for secondary access nodes 121-122 from other network elements (e.g. network elements 150), and/or implement some other technique to determine frequency channel size.

BBU 140 determines an add threshold for secondary access node 121 based on the frequency channel size of secondary access node 121. Likewise, BBU 140 determines an add threshold for secondary access node 122 based on the frequency channel size for secondary access node 122. Typically, BBU 140 selects high add thresholds when the frequency channel size is small and low add thresholds when the frequency channel size is large. BBU 140 determines add values for secondary access nodes 121-122 based on the signal metric in the measurement report. BBU 140 may implement a data structure to convert the reported signal metric for secondary access nodes 121-122 into add values for secondary access nodes 121-122. For example, BBU 140 may determine the signal strength for secondary access node 121 at UE 101's location is high and implement a data structure that converts the high signal strength into a high add value. Conversely, BBU 140 may determine the signal strength for secondary access node 121 at UE 101's location is low and implement a data structure that converts the low signal strength into a low add value.

BBU 140 determines when the add values for secondary access nodes 121-122 exceed their corresponding add thresholds. When the add values exceed their corresponding add thresholds, BBU 140 determines to add secondary access nodes 121-122. BBU 140 transfers network signaling to secondary access nodes 121-122 to serve UE 101 and user signaling to radio 130 for UE 101 to attach to secondary access nodes 121-122. Radio 130 wirelessly transfers the user signaling to UE 101. In response to the user signaling from radio 130, UE 101 wirelessly exchanges user signaling with secondary access nodes 121-122 to attach to secondary access nodes 121-121. Secondary access nodes 121-122 exchange user data for the wireless communication service with UE 101.

Although UE 101 is depicted exchanging user data with both of secondary access nodes 121-122, in some examples BBU 140 may determine to add only one, or neither, of secondary access nodes 121-122 when the add values do not exceed the corresponding add thresholds. In these examples, BBU 140 may direct UE 101 to periodically remeasure the signal metric for the unadded secondary access nodes until the add value exceeds the corresponding add threshold.

Figure 4:
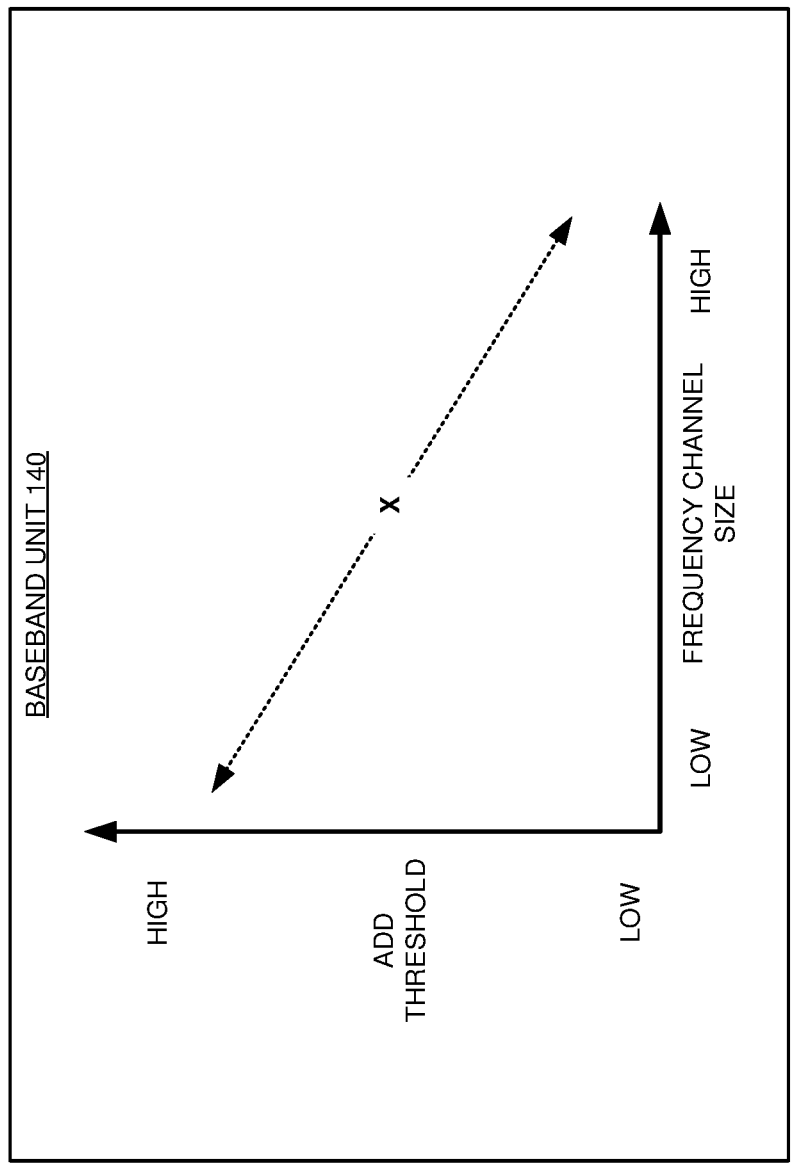
FIG. 4 illustrates a Baseband Unit (BBU) to implement a data structure that correlates addition thresholds to frequency channel sizes.

FIG. 4 illustrates an exemplary operation of BBU 140 to serve UEs over multiple wireless links based on frequency channel size. The operation of BBU 140 could vary in other examples. BBU 140 hosts a data structure that implements the graph shown on FIG. 4. The vertical axis of the graph indicates an add threshold in an exemplary range: Low to High. The horizontal axis indicates a frequency channel size in an exemplary range: Low to High. These terms are illustrative and numerical values could be used. Typically, a "low" frequency channel size is around 20 MHz and a "low" add threshold is around −130 dBm while a "high" frequency channel size is around 200 MHz and a "high" add threshold is around −100 dBm. As indicated by the X mark on the graph, a frequency channel size correlates to an add threshold. BBU 140 determines the add thresholds for secondary access nodes 121-122 based on the frequency channel sizes of secondary access nodes 121-122 and the data structure. The add threshold may comprise a B1 add threshold, 5GNR add threshold, or some other type of wireless addition threshold.

In some examples, BBU 140 may implement additional data structures to correlate other radio metrics from a secondary access node to add thresholds. For example, BBU 140 may implement a data structure that correlates frequency channel interference for a secondary access node to an add threshold. BBU 140 may determine an average add threshold for a secondary access node based on the add threshold of frequency channel size and the add thresholds of the other radio metrics. In some examples, BBU 140 may determine a weighted average add threshold based on the add threshold of frequency channel size and the add thresholds of the other radio metrics.

Advantageously, BBU 140 effectively and efficiently determines the add thresholds based on frequency channel size to serve wireless user devices. Moreover, BBU 140 optimizes wireless access point loading to enhance wireless network performance.

Figure 5:
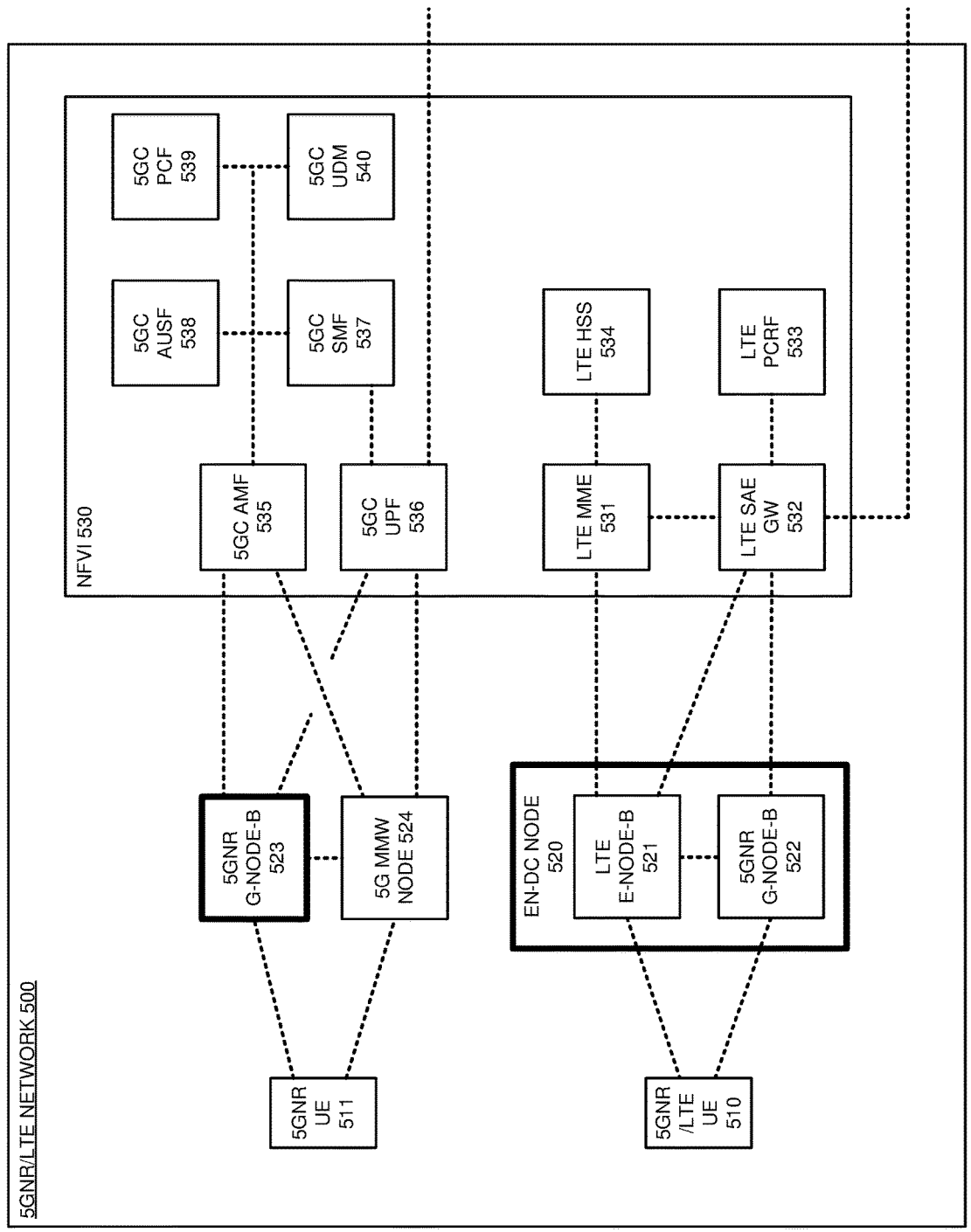
FIG. 5 illustrates a Fifth Generation New Radio (5GNR) Long Term Evolution (LTE) network to serve UEs over multiple wireless links based on frequency channel size.

FIG. 5 illustrates Fifth Generation New Radio (5GNR) Long Term Evolution (LTE) network 500 to serve UEs 510-511 based on frequency channel size. 5GNR/LTE network 500 is an example of wireless communication network 100, although network 100 may differ. 5GNR/LTE network 500 comprises 5GNR/LTE UE 510, 5GNR UE 511, EN-DC node 520, 5GNR gNodeB 523, 5G MMW node 524, and Network Function Virtualization Infrastructure (NFVI) 530. EN-DC node 520 comprises LTE eNodeB 521 and 5GNR gNodeB 522. NFVI 530 comprises LTE Mobility Management Entity (MME) 531, LTE System Architecture Evolution Gateway (SAE GW) 532 LTE, LTE Policy Charging Rules Function (PCRF) 533, LTE Home Subscriber System (HSS) 534, Fifth Generation Core (5GC) Access and Mobility Management Function (AMF) 535, 5GC User Plane Function (UPF) 536, 5GC Session Management Function (SMF) 537, 5GC Authentication and Security Function (AUSF) 538, Policy Control Function (PCF 539), and 5GC Unified Data Manager (UDM) 540. In some examples, SAE GW 532 may be divided into a Serving Gateway (SGW) and a Packet Data Network Gateway (PGW).

In operation, UE 510 attaches to LTE eNodeB 521 in EN-DC node 520 and UE 510 indicates its 5G capabilities. LTE eNodeB 521 requests data service for UE 510 from LTE MME 531 over S1-MME signaling and indicates the 5G capabilities of UE 510. LTE MME 531 interacts with HSS 534 to authenticate and authorize LTE/5GNR UE 510 for wireless data services that are represented by Access Point Names (APNs). LTE MME 531 generates a B1 measurement object for 5GNR/LTE UE 510 in response to the 5G UE capabilities and the UE authorization. The B1 measurement object may specify frequency bands for UE 510 to measure and/or other parameters for UE 510 to use when establishing duel connectivity. LTE MME 531 transfers the APNs for UE 510 to SAE GW 532. SAE GW 532 interacts with LTE PCRF 533 to select Quality-of-Service Class Identifiers (QCIs) and network addresses for UE 510 based on the APNs. SAE GW 532 transfers the APNs, QCIs, and network addresses for UE 510 to LTE MME 531. MME 531 transfers the APNs, QCIs, network address, and the B1 measurement object for UE 510 to LTE eNodeB 521. LTE SAE GW 532 exchanges user data for UE 510 with external systems. SAE GW 532 exchanges the user data with LTE eNodeB 521. LTE eNodeB 521 transfers the APNs, QCIs, network address, and the B1 measurement object to UE 510. LTE eNodeB 521 exchanges the user data with UE 510.

In response to the B1 measurement object, UE 510 measures the signal strength of the reference signal from 5GNR gNodeB 522. UE 510 generates a measurement report that characterizes the signal strength and transfers the measurement report to LTE eNodeB 521. LTE eNodeB 521 determines a frequency offset and hysteresis for 5GNR gNodeB 522. LTE eNodeB 521 determines a frequency channel size for 5GNR gNodeB 522. For example, LTE eNodeB 521 may request information relating to the frequency channel size from 5GNR gNodeB 522 over X2 signaling. LTE eNodeB 521 determines a B1 addition threshold for 5GNR gNodeB 522 based on the frequency channel size of 5GNR gNodeB 522. In some examples, LTE eNodeB 521 implements a data structure that correlates frequency channel sizes to B1 addition thresholds to select B1 thresholds for 5GNR gNodeB 522. Typically, LTE eNodeB 521 selects a high B1 addition threshold when the frequency channel size for 5GNR gNodeB 522 is small. Conversely, LTE eNodeB 521 selects a low B1 addition threshold when the frequency channel size for 5GNR gNodeB 522 is large.

LTE eNodeB 521 determines an inter Radio Access Technology (RAT) addition value for 5GNR gNodeB 522 based on the measurement report received from UE 510. Typically, the inter-RAT addition value comprises a sum of the signal strength, the frequency offset, and the hysteresis. LTE eNodeB 521 determines when the inter-RAT addition value for 5GNR gNodeB 522 is greater than the B1 addition threshold for 5GNR gNodeB 522. When the inter-RAT addition value is greater than the B1 addition threshold for 5GNR gNodeB 522, LTE eNodeB 521 directs 5GNR gNodeB 522 to serve UE 510 and directs UE 510 to attach to 5GNR gNodeB 522. LTE eNodeB 521 notifies LTE MME 531 and LTE MME 531 directs SAE GW 532 to serve UE 510 over 5GNR gNodeB 522. In response, LTE SAE GW 532 exchanges user data for UE 510 with 5GNR gNodeB 522. 5GNR gNodeB 522 exchanges the user data with UE 510.

In some examples, LTE eNodeB 521 determines a B1 drop threshold for 5GNR gNodeB 522 based on the frequency channel size for 5GNR gNodeB 522. The B1 drop threshold may comprise a different threshold value than the B1 addition threshold. LTE eNodeB 521 receives a subsequent 5GNR signal strength measurement for 5GNR gNodeB 522 from UE 510. LTE eNodeB 521 determines an inter-RAT drop value for 5GNR gNodeB 522 based on the sum of the subsequent signal strength, the frequency offset, and the hysteresis. When the inter-RAT drop value for 5GNR gNodeB 522 is lower than the B1 drop threshold for 5GNR gNodeB 522, LTE eNodeB 521 signals 5GNR gNodeB 522 to stop serving UE 510 and signals UE 510 to detach from 5GNR gNodeB 522. LTE MME 531 directs LTE SAE GW 532 to stop serving UE 510 over 5GNR gNodeB 522. In response, LTE SAE GW 532 stops exchanging the user data for UE 510 with 5GNR gNodeB 522. 5GNR gNodeB 522 stops exchanging the user data with UE 510.

In some examples, LTE eNodeB 521 determines B1 addition thresholds based on the frequency channel size for 5GNR gNodeB 522 and other radio metrics for 5GNR gNodeB 522. The other radio metrics for 5GNR gNodeB 522 comprise frequency channel interference, uplink noise rise, UE load, frequency band call drop rate, frequency band call fail rate, frequency band path loss, frequency band fading, uplink toggle rate, and/or some other radio metric. Frequency channel interference comprises the amount of interference for a frequency channel. Uplink noise rise comprises the total received interference power over background noise power. UE load comprises the amount of UEs served by an access node. Call drop rate comprises the ratio of abnormal connection releases to normal connection releases between UEs and access nodes. Call fail rate comprises the ratio of failed connection attempts to successful connection attempts between UEs and access nodes. Frequency band fading comprises variation of the attenuation of a signal with respect to time, geographical position, and/or radio frequency. Uplink toggle rate comprises the rate a UE changes UL connection with access nodes.

LTE eNodeB 521 may implement individual data structures for each additional radio metric to determine B1 add thresholds based on each of the additional radio metrics. LTE eNodeB 521 may then determine an aggregate B1 addition threshold for 5GNR gNodeB 522 based on the average of the B1 addition threshold for frequency channel size and the B1 addition thresholds for each of the additional radio metrics. For example, LTE eNodeB 521 may determine the frequency channel size, frequency channel interference, and frequency channel uplink noise rise for 5GNR gNodeB 522. LTE eNodeB 521 may then implement data structures to determine individual add thresholds based on the frequency channel size, the frequency channel interference, and the frequency channel uplink noise rise. LTE eNodeB 521 may then determine an aggregate B1 addition threshold for 5GNR gNodeB 521 by averaging the individual add thresholds. In some examples, LTE eNodeB 521 may determine a weighted average of the individual addition thresholds to determine the aggregate B1 addition threshold for 5GNR gNodeB 522.

In some examples, LTE eNodeB 521 performs dynamic bandwidth sharing with 5GNR gNodeB 522. Dynamic bandwidth sharing comprises transferring resource blocks between different frequency channels. For example, LTE eNodeB 521 may transfer resource blocks from a frequency channel used by LTE eNodeB 521 to a frequency channel used by 5GNR gNodeB 522 to increase the frequency channel size for 5GNR gNodeB 522. Typically, LTE eNodeB 521 will perform dynamic bandwidth sharing when either LTE eNodeB 521 or 5GNR gNodeB 522 becomes overloaded.

Note that 5GNR gNodeB 523 and 5G MMW node 524 use different types of 5G Radio Access Technology (RAT). The different types of 5G RAT may have different frequency channel sizes, frequency levels, resource block time intervals, and resource block bandwidths. For example, 5GNR gNodeB 523 may provide an enhanced voice calling service with unique time intervals and bandwidths while MMW node 524 may provide an enhanced video broadcast service with unique time intervals and bandwidths while. Some 5GNR UEs are not capable of using each type of 5G RAT from 5GNR gNodeB 523 and 5G MMW node 524, but 5GNR UE 511 is capable of using each type of 5G RAT.

In operation, 5GNR UE 511 attaches to 5GNR gNodeB 523 and indicates its 5G capabilities for multiple types of 5G RAT. 5GNR gNodeB 523 requests data service the indicates the 5G capabilities for UE 511 from 5GC AMF 535 over N2 signaling. 5GC AMF 535 interacts with 5GC SMF 537, 5GC AUSF 538, 5GC UDM 540, and 5GC PCF 539 to authenticate and authorize 5GNR UE 511 for 5G data services. 5GC AMF 535 generates a 5GNR measurement object in response to the 5G UE capabilities and the 5G authorization. The 5GNR measurement object may specify frequency bands for UE 511 to measure when establishing duel connectivity or other parameters for UE 511 to establish duel connectivity. 5GC AMF 535 transfers quality-of-service metrics, network addressing, and 5GNR measurement object for UE 511 to 5GNR gNodeB 523 and 5GC SMF 537. 5GC SMF 537 directs 5GC UPF 536 to serve UE 511 per the quality-of-service metrics and network addressing over 5GNR gNodeB 523. 5GNR gNodeB 523 transfers the selected APNs, QCIs, network addresses, and 5GNR measurement object to UE 511. 5GNR gNodeB 523 exchanges user data with UE 511.

In response to the 5GNR measurement object, UE 510 measures the signal strength of the reference signal from 5G MMW node 524. UE 510 generates a measurement report that characterizes the signal strength for 5G MMW node 524 and transfers the measurement report to 5GNR gNodeB 523. 5GNR gNodeB 523 determines a frequency offset and hysteresis for 5G MMW node 524. 5GNR gNodeB 523 determines a frequency channel size for 5G MMW node 524. For example, 5GNR gNodeB 523 may receive the frequency channel size for 5G MMW node 524 from 5GC AMF 535 over N2 signaling. 5GNR gNodeB 523 determines an inter-RAT addition threshold for 5G MMW node 524 based on the frequency channel size of 5GNR gNodeB 522. In some examples, 5GNR gNodeB 523 implements a data structure that correlates frequency channel sizes to inter-RAT addition thresholds to select inter-RAT thresholds for 5G MMW node 524. Typically, 5GNR gNodeB 523 selects a high inter-RAT addition threshold when the frequency channel size for 5G MMW node 524 is small. Conversely, 5GNR gNodeB 523 selects a low inter-RAT addition threshold when the frequency channel size for 5G MMW node 524 is large.

5GNR gNodeB 523 determines an inter-RAT addition value for 5G MMW node 524 based on the measurement report received from UE 510. Typically, the inter-RAT addition value comprises a sum of the signal strength, the frequency offset, and the hysteresis for MMW node 524. 5GNR gNodeB 523 determines when the inter-RAT addition value for 5G MMW node 524 is greater than the inter-RAT addition threshold for 5G MMW node 524. When the inter-RAT addition value is greater than the inter-RAT addition threshold, 5GNR gNodeB 523 directs 5G MMW node 524 to serve UE 511 and directs UE 511 to attach to 5G MMW node 524. 5GNR gNodeB 523 notifies 5GC AMF 535 of the attachment. 5GC AMF 535 directs 5GC SMF 537 to direct 5GC UPF 536 to serve UE 511 per the quality-of-service metrics and network addressing over 5G MMW node 524. 5GNR UE 511 attaches to 5G MMW node 524 and 5G MMW node 524 exchanges user data with UE 511.

In some example, 5GNR gNodeB 523 also determines an inter-RAT drop threshold for 5G MMW node 524 based on the frequency channel size for 5G MMW node 524. 5GNR gNodeB 523 receives subsequent signal strength measurements for 5G MMW node 524 from UE 511. 5GNR gNodeB 523 determines an inter-RAT drop value for 5G MMW node 524 based on the subsequent signal strength for 5G MMW node 524, the frequency offset, and the hysteresis. When the inter-RAT drop value for MMW node 524 is lower than the inter-RAT drop threshold for MMW node 524, 5GNR gNodeB 523 signals UE 511 to detach from 5G MMW node 524 and 5G MMW node 524 stops exchanging the user data with UE 511.

In some examples, 5GNR gNodeB 523 determines inter-RAT addition thresholds based on the frequency channel size for MMW node 524 and other radio metrics for 5G MMW node 524. The other radio metrics for 5G MMW node 524 comprise frequency channel interference, uplink noise rise, UE load, frequency band call drop rate, frequency band call fail rate, frequency band path loss, frequency band fading, uplink toggle rate, and/or some other radio metric. 5GNR gNodeB 523 may implement individual data structures for each additional radio metric to determine inter-RAT add thresholds based on each of the additional radio metrics. 5GNR gNodeB 523 may then determine an aggregate inter-RAT addition threshold for 5G MMW node 524 by averaging the inter-RAT addition threshold for frequency channel size and the inter-RAT addition thresholds for each of the additional radio metrics. For example, 5GNR gNodeB 523 may determine the frequency channel size, frequency band call fail rate, and frequency band call drop rate for 5GNR gNodeB 522. LTE eNodeB 521 may then implement data structures to determine individual add thresholds based on the frequency channel size, the frequency band call fail rate, and the frequency band call drop rate. 5GNR gNodeB 523 may then determine an aggregate inter-RAT addition threshold by averaging the individual add thresholds. In some examples, 5GNR gNodeB 523 may determine a weighted average of the individual addition thresholds to determine the aggregate inter-RAT addition threshold for 5G MMW node 524.

In some examples, 5GNR gNodeB 523 performs dynamic bandwidth sharing with 5G MMW node 524. Dynamic bandwidth sharing comprises transferring resource blocks between different frequency channels. For example, 5GNR gNodeB 523 may transfer resource blocks from a frequency channel used by 5GNR gNodeB 523 to a frequency channel used by 5G MMW node 524 to increase the frequency channel size for 5G MMW node 524. Typically, 5GNR gNodeB will perform dynamic bandwidth sharing when either 5GNR gNodeB 523 or 5G MMW node 524 becomes overloaded.

In some examples, UEs 510-511 determine frequency channel sizes for 5GNR gNodeB 522 and MMW node 524 as described above for LTE eNodeB 521 and 5GNR gNodeB 523. UEs 510-511 may request frequency channel size information from the 5GNR gNodeB 522 and 5G MMW node 524. UEs 510-511 report the determined frequency channel sizes to EN-DC node 520 and to 5GNR gNodeB 523 to trigger threshold events based on the reported frequency channel sizes.

Advantageously, LTE eNodeB 521 effectively and efficiently selects B1 thresholds based on frequency channel size to serve UEs over multiple wireless links. Likewise, 5GNR gNodeB 523 effectively and efficiently selects inter-RAT thresholds based on frequency channel size to UEs over multiple wireless links.

Figure 6:
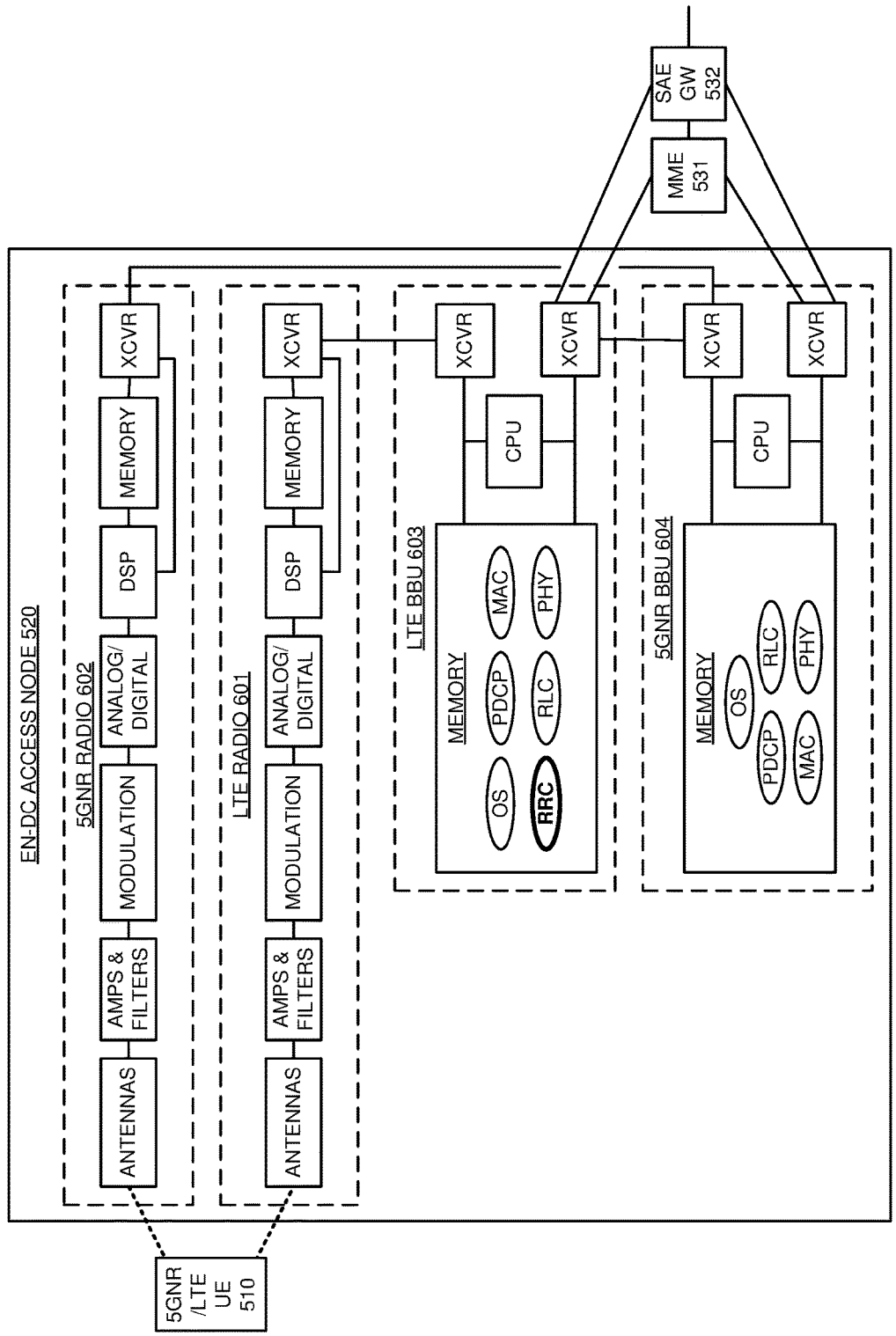
FIG. 6 illustrates an Evolved Universal Terrestrial Radio Access Network Dual Connectivity (EN-DC) access node to serve a 5GNR/LTE UE over multiple wireless links based on frequency channel size.

FIG. 6 illustrates EN-DC access node 520 to provide wireless communications service to UE 510 over multiple wireless links based on frequency channel size. EN-DC access node 520 is an example of primary access node 120, although primary access node 120 may differ. As shown in FIG. 5, EN-DC access node 520 includes LTE eNodeB 521 and 5GNR gNodeB 522, however individual structures for LTE eNodeB 521 and 5GNR gNodeB 522 are omitted for clarity. EN-DC access node 520 comprises LTE radio 601, 5GNR radio 602, LTE Baseband Unit (BBU) 603, and 5GNR BBU 604. Radios 601-602 comprise antennas, amplifiers, filters, modulation, analog-to-digital interfaces, DSP, memory, and transceivers (XCVR) that are coupled over bus circuitry. BBUs 603-604 comprise memory, CPU, and transceivers that are coupled over bus circuitry. The memories in BBUs 603-604 store operating systems (OS) and network applications like Physical Layer (PHY), Media Access Control (MAC), Radio Link Control (RLC), Packet Data Convergence Protocol (PDCP), and Radio Resource Control (RRC). The CPUs in BBUs 603-604 execute the operating systems, PHYs, MACs, RLCs, PDCPs, and RRCs to exchange network signaling between UE 510 and MME 531 and to exchange user data between UE 510 and SAE GW 532.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 510 is wirelessly coupled to the antennas in LTE radio 601 over an LTE link. The transceiver in LTE radio 601 is coupled to a transceiver in LTE BBU 603 over Common Public Radio Interface (CPRI) links. A transceiver in LTE BBU 603 is coupled to MME 531 and SAE GW 532 over backhaul links. UE 510 is wirelessly coupled to the antennas in 5GNR radio 602 over an 5GNR link. The transceiver in 5GNR radio 602 is coupled to a transceiver in 5GNR BBU 604 over CPRI links. A transceiver in 5GNR BBU 604 is coupled to MME 531 and to SAE GW 532 over backhaul links. A transceiver in LTE BBU 603 is coupled to a transceiver in 5GNR BBU 604 over X2 links.

In operation, UE 510 wirelessly attaches to LTE antennas in LTE radio 601. The LTE antennas in LTE radio 601 receive wireless LTE signals from UE 510 that transport Uplink (UL) LTE signaling, UL LTE data. The UL signaling indicates 5GNR capabilities for UE 510. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capabilities of UE 510, to MME 531 over the backhaul links. MME 531 authenticates and authorizes 5GNR service for UE 510. In response to the authentication and authorization, MME 531 generates a B1 measurement object specifying frequency bands for UE 510 to measure. In LTE BBU 603, the LTE RRC receives the DL S1-MME signaling including the B1 measurement object from MME 531. The LTE PDCP transfers the UL LTE data to LTE SAE GW 532 over the backhaul links. The LTE PDCP receives DL LTE data from SAE GW 532.

The LTE network applications process the new DL LTE signaling and the DL LTE data to generate corresponding DL LTE symbols that carry the DL LTE signaling, DL LTE data, and the B1 measurement object. In LTE radio 601, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and B1 measurement object to UE 510.

In response to the B1 measurement object, UE 510 measures signal strength of the reference signal for 5GNR BBU 604. UE 510 wirelessly transfers a measurement report that characterizes the 5GNR signal strength to LTE radio 601. LTE radio transfers the measurement report to LTE BBU 604 over the CPRI links.

The LTE RRC in LTE BBU 603 determines frequency channel size for 5GNR BBU 604. For example, the LTE RRC may retrieve the frequency channel size from memory, request the frequency channel size from 5GNR BBU 504, or may determine frequency channel size by some other method. The LTE RRC in LTE BBU 603 determines a B1 add threshold for 5GNR BBU 604 based on the frequency channel size for 5GNR BBU 604. The LTE RRC may implement a data structure to determine the B1 add threshold. In some examples, the LTE RRC in LTE BBU 603 determines additional radio metrics for 5GNR BBU 604 to determine the B1 addition threshold. The additional metrics may include frequency channel interference, uplink noise rise, UE load, frequency band call drop rate, frequency band call fail rate, frequency band path loss, frequency band fading, uplink toggle rate, and/or some other radio metric. For example, the LTE RRC in BBU 603 may direct the 5GNR PHY in 5GNR BBU 604 to measure frequency channel interference. The LTE RRC may then determine a B1 addition threshold for 5GNR BBU 604 based on the frequency channel size and the frequency channel interference. In other examples, the LTE RRC may determine B1 addition thresholds based on frequency channel size and other combinations of the additional radio metrics.

The LTE RRC in LTE BBU 603 determines frequency offset and hysteresis for 5GNR BBU 604. The LTE RRC in BBU 603 determines an inter-RAT add value for 5GNR BBU 604 based on the sum of the signal strength, the frequency offset, and the hysteresis for 5GNR BBU 604. The LTE RRC in BBU 603 determines when the inter-RAT add value is greater than the B1 add threshold. When the inter-RAT add value for 5GNR BBU 604 exceeds the B1 add threshold for 5GNR BBU 604, the LTE RRC in BBU 603 directs the 5GNR PDCP in 5GNR BBU 604 to serve UE 510. The LTE RRC in BBU 603 also directs UE 510 to attach to the 5GNR PDCP in 5GNR BBU 604 over LTE radio 601. UE 510 attaches to the 5GNR PDCP in BBU 604 over 5GNR radio 602. The LTE RRC in BBU 603 notifies MME 531 of the 5GNR attachment. MME 531 directs SAE GW 532 to serve UE 510 over 5GNR BBU 604. SAE GW 532 exchanges 5GNR data with the 5GNR PDCP in 5GNR BBU 604. The 5GNR PDCP in BBU 604 exchanges the 5GNR data with the 5GNR PDCP in UE 510 over the RLCs, MACs, and PHYs.

In 5GNR radio 602, the antennas receive wireless 5GNR signals from UE 510 that transport Uplink (UL) 5GNR signaling and UL 5GNR data. The antennas in 5GNR radio 602 transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 603 to generate new UL X2 signaling and new DL 5GNR signaling. The 5GNR PDCP transfers the new UL X2 signaling to the LTE RRC in BBU 603. The 5GNR PDCP transfers the UL 5GNR data to SAE GW 532 over backhaul links.

In 5GNR BBU 604, the 5GNR PDCP receives the DL X2 signaling from the LTE RRC in BBU 603. The 5GNR PDCP also receives DL 5GNR data from SAE GW 532. The 5GNR network applications process the new DL 5GNR signaling and the DL 5GNR data to generate corresponding DL 5GNR symbols that carry the DL 5GNR signaling and DL 5GNR data. In 5GNR radio 602, the DSPs process the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas in 5GNR radio 602 to emit corresponding wireless 5GNR signals that transport the DL 5GNR signaling and DL 5GNR data to UE 510.

In this example, the LTE RRC in LTE BBU 603 also determines a B1 drop threshold for 5GNR BBU 604 based on the frequency channel size for 5GNR BBU 604. The LTE RRC in BBU 603 wirelessly receives a subsequent measurement report that characterizes 5GNR signal strength for 5GNR BBU 604 from UE 510. The LTE RRC in LTE BBU 603 determines an inter-RAT drop value for 5GNR BBU 604 based on the subsequent signal strengths, the frequency offsets, and the hysteresis. The LTE RRC in LTE BBU 603 stops the service to UE 510 over 5GNR radio 602 when the inter-RAT drop value for 5GNR BBU 604 is less than the B1 drop threshold for 5GNR BBU 604. When the inter-RAT drop value for 5GNR BBU 604 is less than the B1 drop threshold, the LTE RRC in LTE BBU 603 directs the 5GNR PDCP in BBU 604 to stop serving UE 510 and notifies MME 531. The LTE RRC in LTE BBU 603 directs UE 510 to detach from 5GNR PDCP in 5GNR BBU 604. UE 510 wirelessly detaches from 5GNR BBU 604. MME 531 directs SAE GW 532 to stop serving UE 510 over 5GNR BBU 604. SAE GW 532 stops exchanging 5GNR data with the 5GNR PDCP in 5GNR BBU 604. The 5GNR PDCP in BBU 604 stops exchanging the 5GNR data with the 5GNR PDCP in UE 510 over the RLCs, MACs, and PHYs.

Figure 7:
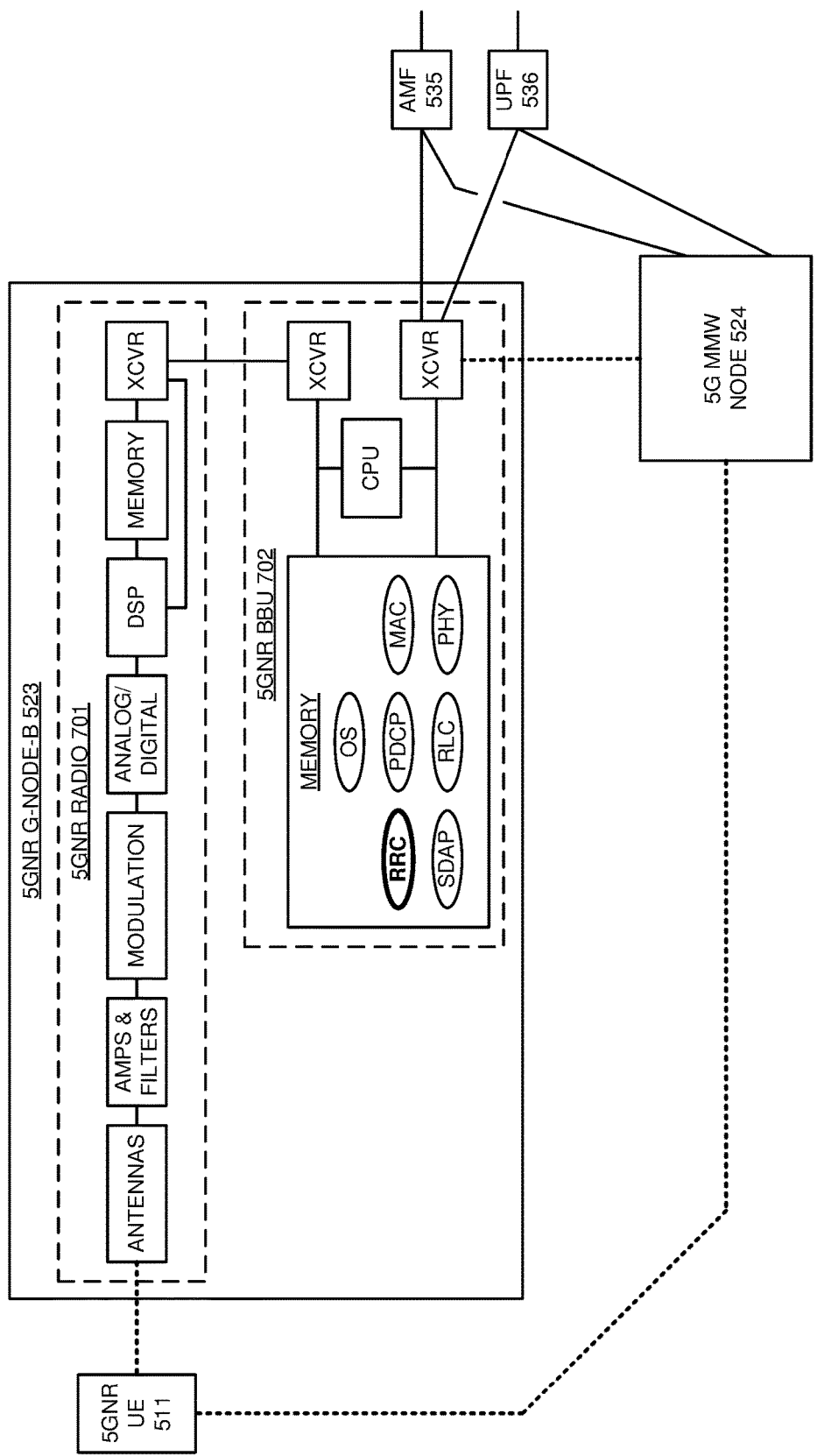
FIG. 7 illustrates a 5GNR gNodeB to serve 5GNR UE over multiple wireless links based on frequency channel size.

FIG. 7 illustrates 5GNR gNodeB 523 to serve 5GNR UE 511 over multiple wireless links based on frequency channel size. 5GNR gNodeB 523 is an example of primary access node 120, although access node 120 may differ. 5GNR gNodeB 523 comprises 5GNR radio 701 and 5GNR BBU 702. 5GNR radio 701 comprises antennas, amplifiers, filters, modulation, analog-to-digital interfaces, DSP, memory, and transceivers that are coupled over bus circuitry. 5GNR UE 511 is wirelessly coupled to the antennas in 5GNR radio 701 over a 5GNR link. The transceiver in 5GNR radio 701 is coupled to a transceiver in 5GNR BBU 702 over CPRI links. A transceiver in 5GNR BBU 702 is coupled to AMF 535 and UPF 536 over backhaul links. 5GNR BBU 702 comprises memory, CPU, and transceivers that are coupled over bus circuitry. The memory in BBU 702 stores operating systems and network applications like PHY, MAC, RLC, PDCP, RRC, and Service Data Adaptation Protocol (SDAP). The CPU in BBU 702 executes the operating systems, PHYs, MACs, RLCs, PDCPs, SDAPs, and RRCs to exchange network signaling with 5GNR UE 511 and AMF 535 and to exchange user data between 5GNR UE 511 and UPF 536.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, 5GNR UE 511 wirelessly attaches to 5GNR radio 701. In 5GNR radio 701, the antennas receive wireless 5GNR signals from 5GNR UE 511 that transport UL 5GNR signaling and UL 5GNR data. The 5G UL signaling from UE 511 indicates 5G capabilities for UE 511. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5G RRC in 5GNR BBU 702 processes the UL 5GNR signaling and DL N2 signaling from AMF 535 to generate new UL N2 signaling and new DL 5GNR signaling. The 5GNR RRC transfers the new UL N2 signaling to AMF 535. The 5GNR SDAP in 5GNR BBU 702 transfers the UL 5GNR data to UPF 536 over backhaul links.

5GC AMF 535 interacts with 5GC SMF 537, 5GC AUSF 538, 5GC UDM 540, and 5GC PCF 539 to authenticate and authorize 5GNR UE 511 for 5G MMW services. 5GC AMF 535 generates a 5GNR measurement object for 5GNR UE 511 responsive to the 5G UE capabilities and the authorization that specifies frequencies for 5GNR UE 511 to measure when establishing duel connectivity. 5GC AMF 535 transfers the quality-of-service metrics, network addressing to 5GC SMF 537 and transfers the quality-of-service metrics, network addressing and 5GNR measurement object for UE 511 to the 5GNR RRC in BBU 602. 5GC SMF 537 directs 5GC UPF 536 to serve UE 511 per the quality-of-service metrics and network addressing over 5GNR gNodeB 523.

In 5GNR BBU 702, the 5GNR RRC receives the DL N2 signaling from AMF 535. The 5GNR SDAP receives DL 5GNR data from UPF 536. The 5GNR network applications process the new DL 5GNR signaling and the DL 5GNR data to generate corresponding DL 5GNR symbols that carry the DL 5GNR signaling and DL 5GNR data. In 5GNR radio 701, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling, DL 5GNR data, and 5GNR measurement object to 5GNR UE 511.

The 5GNR RRC in 5GNR BBU 702 determines frequency channel size for 5G MMW node 524. For example, the 5GNR RRC may request information relating to frequency channel size from 5G MMW node 524. The 5GNR RRC in 5GNR BBU 702 determines an inter-RAT addition threshold for 5G MMW node 524 based on the frequency channel size for 5G MMW node 524. The 5GNR RRC may implement a data structure that correlates frequency channel size to inter-RAT add thresholds to determine the inter-RAT add threshold for 5G MMW node 524. In some examples, the 5GNR RRC in 5GNR BBU 702 determines additional radio metrics for 5G MMW node 524 in addition to the frequency channel size to determine the inter-RAT addition threshold. The additional radio metrics may include frequency channel interference, uplink noise rise, UE load, frequency band call drop rate, frequency band call fail rate, frequency band path loss, frequency band fading, uplink toggle rate, and/or some other radio metric. For example, the 5GNR RRC in 5GNR BBU 702 may direct the MMW PHY in 5G MMW node 524 to measure frequency band path loss and frequency band fading. The 5GNR RRC may then determine an inter-RAT addition threshold for 5GNR BBU 604 based on the frequency channel size, the frequency path loss, and the frequency band fading. In other examples, the 5GNR RRC may determine inter-RAT addition thresholds based on frequency channel size and other combinations of the additional radio metrics.

In response to the 5GNR measurement object, UE 511 measures signal strength of the reference signal for 5G MMW node 524 wirelessly transfers a measurement report that characterizes the signal strength to the 5GNR RRC in BBU 702 over 5GNR radio 701. The 5GNR RRC in BBU 702 determines frequency offset and hysteresis for 5G MMW node 524. The 5GNR RRC determines an inter-RAT addition value for 5G MMW node 524 based on the signal strength for 5G MMW node 524, the frequency offset, and the hysteresis. The 5GNR RRC in BBU 702 determines when the inter-RAT addition value is greater than the inter-RAT addition threshold for 5G MMW access node 524. When the inter-RAT addition value for 5G MMW node 524 is greater than the inter-RAT addition threshold for 5G MMW node 524, the 5GNR RRC in BBU 702 directs 5G MMW node 524 to serve UE 511 and directs UE 511 to attach to 5G MMW node 524. The 5GNR RRC in 5GNR BBU 702 notifies 5GC AMF 535 of the attachment and 5GC AMF 535 directs 5GC SMF 537 to direct 5GC UPF 536 to serve UE 511 per the quality-of-service metrics and network addressing over 5G MMW node 524. 5GNR UE 511 attaches to 5G MMW node 524. 5G MMW node 524 exchanges user data with UE 511.

The 5GNR RRC in BBU 702 also determines an inter-RAT drop threshold for 5G MMW node 524 based on the frequency channel size for 5G MMW node 524. The 5GNR RRC in BBU 702 receives a subsequent measurement report from UE 511 that characterizes the signal strength for 5G MMW node 524. The 5GNR RRC in BBU 702 determines an inter-RAT drop value for 5G MMW node 524 based on the subsequent signal strength for 5G MMW node 524, the frequency offset, and the hysteresis. When the drop value for 5G MMW node 524 is lower than the drop threshold 5G MMW node 524, the 5GNR RRC in BBU 602 signals UE 511 to detach from 5G MMW node 524 and 5G MMW node 524 stops exchanging the user data with UE 511.

Figure 8:
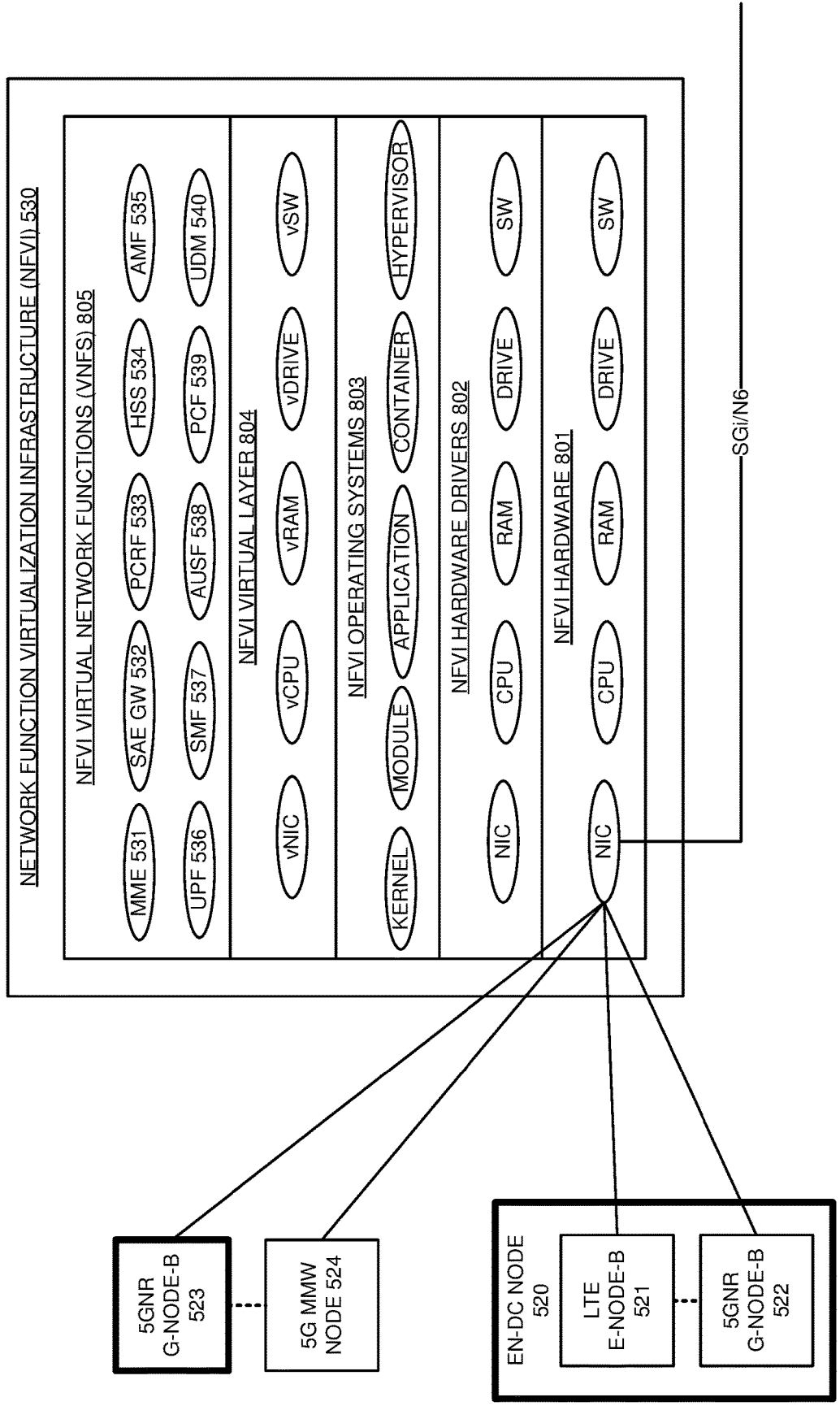
FIG. 8 illustrates a Network Function Virtualization Infrastructure (NFVI) to serve UEs over multiple wireless links based on frequency channel size.

FIG. 8 illustrates Network Function Virtualization Infrastructure (NFVI) 530 to serve UEs 510-511 over multiple wireless links based on frequency channel size. NFVI 530 is an example of network elements 150, although network elements 150 may differ. NFVI 530 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NIC), CPU, RAM, flash/disk drives, and data switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises virtual NICs (vNIC), virtual CPUs (vCPU), virtual RAM (vRAM), virtual Drives (vDRIVE), and virtual Switches (vSW). NFVI VNFs 805 comprise MME 531, SAE GW 532, PCRF 533, HSS 534, AMF 535, UPF 536, SMF 537, AUSF 538, PCF 539, and UDM 540. Other LTE VNFs and 5GC VNFs are typically present but are omitted for clarity. The NIC is coupled to EN-DC node 520, 5GNR gNodeB 523, 5G MMW node 524, and to external systems. NFVI hardware 801 executes NFVI hardware drivers 802, NFVI operating systems 803, NFVI virtual layer 804, and NFVI VNFs 805 to serve UEs 510-511 over EN-DC node 520, 5GNR gNodeB 523, and 5G MMW node 524.

MME 531 receives S1-MME signaling from LTE eNodeB 521 that requests data services for UE 510 and indicates 5G capabilities for UE 510. MME 531 interacts with HSS 534 to authenticate and authorize UE 510 for wireless data services that are represented by APNs. In response to the 5G UE capabilities and the authorization MME 531 generates a B1 measurement object for UE 510 that specifies frequencies for UE 510 to measure when establishing duel connectivity. MME 531 transfers the APNs for UE 510 to SAE GW 532. SAE GW 532 interacts with PCRF 533 to select QCIs and network addresses for UE 510 based on the APNs. SAE GW 532 transfers the APNs, QCIs, and addresses to MME 531. MME 531 transfers the APNs, QCIs, network addresses, and B1 measurement object for UE 510 to LTE eNodeB 521. MME 531 receives S1-MME signaling from LTE eNodeB 521 for UE 510. SAE GW 532 exchanges user data for UE 510 with external systems. SAE GW 532 exchanges the user with LTE eNodeB 521 and 5GNR gNodeB 522.

AMF 535 receives N2 signaling from 5GNR gNodeB 523 that requests data service for UE 511 and indicates 5G capabilities for UE 511. AMF 535 interacts with SMF 537, AUSF 538, PCF 539, and UDM 540 to authenticate and authorize 5GNR UE 511 for 5G data services. AMF 535 generates a 5GNR measurement object responsive to the 5G UE capabilities and the authorization that specifies frequencies for UE 511 to measure when establishing duel connectivity. AMF 535 transfers quality-of-service metrics, network addressing, and the 5GNR measurement object for 5GNR UE 511 to 5GNR gNodeB 523. AMF 536 receives N2 signaling from 5GNR gNodeB 523 indicating the attachments. AMF 535 directs SMF 537 drive UPF 536 to serve UE 511 over 5G MMW node 524 per the quality-of-service metrics and network addressing. SMF 537 directs UPF 536 to serve UE 511 over 5GNR gNodeB 523 per the quality-of-service metrics and network addressing.

Figure 9:
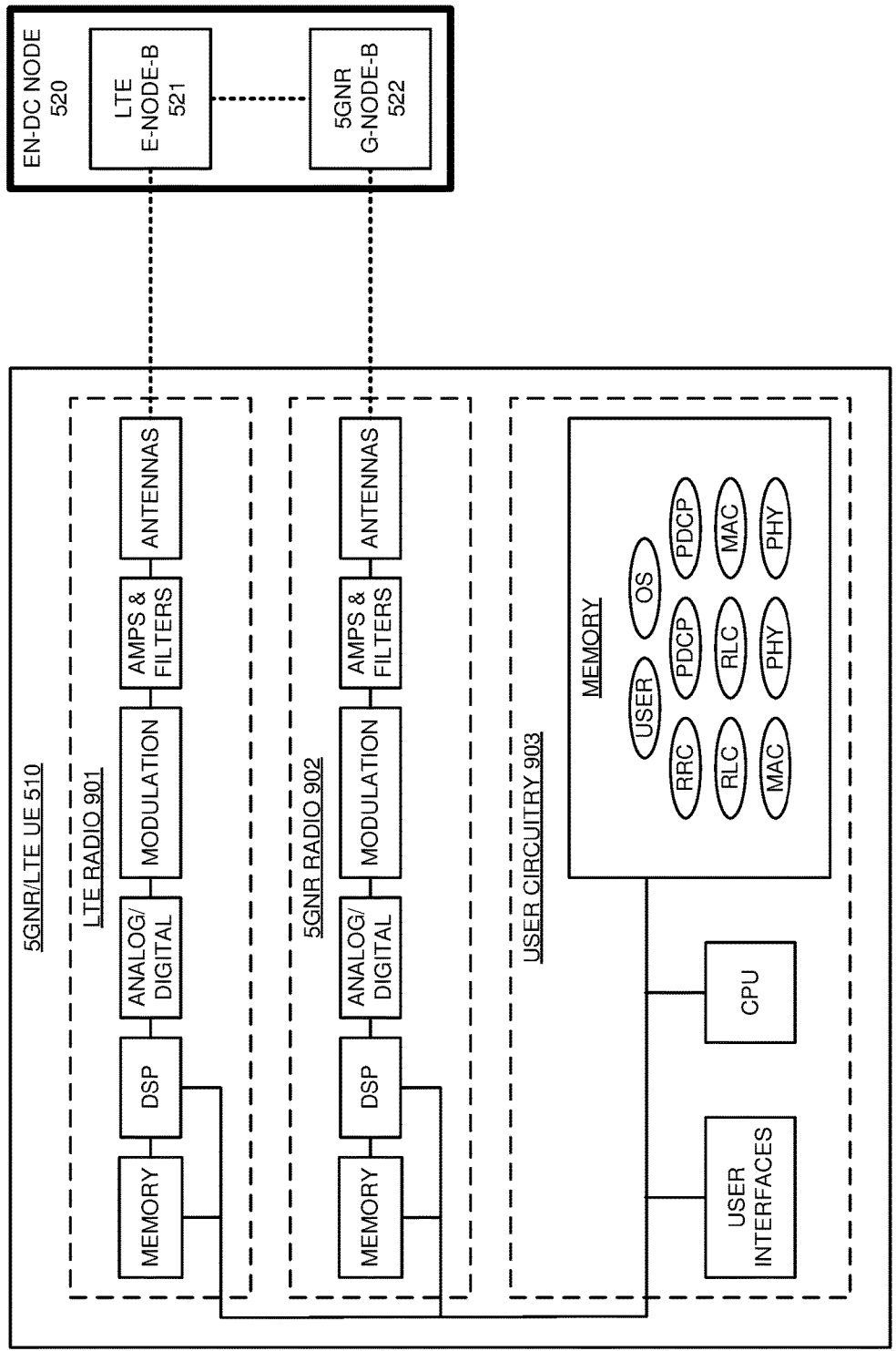
FIG. 9 illustrates the 5GNR/LTE UE that is served by the EN-DC access node over multiple wireless links based on frequency channel size.

FIG. 9 illustrates 5GNR/LTE UE 510 that is served by EN-DC access node 520 over multiple wireless links based on frequency channel size. 5GNR/LTE UE 510 is an example of UE 101, although UE 101 may differ. UE 510 comprises LTE radio 901, 5GNR radio 902, and user circuitry 903 that are coupled over bus circuitry. Radios 901-903 comprise antennas, amplifiers, filters, modulation, analog-to-digital interfaces, DSP, and memory that are coupled over bus circuitry. User circuitry 903 comprises user interfaces, CPU, and memory that are coupled over bus circuitry.

The antennas in radios 901 and 902 are wirelessly coupled to LTE eNodeB 521 and 5GNR gNodeB 522. The user interfaces in user circuitry 903 comprise graphic displays, machine controllers, sensors, cameras, transceivers, and/or some other user components. The memory in user circuitry 903 stores an operating system, user applications (USER), and network applications (PHY, MAC, RLC, PDCP, and RRC). The CPU in user circuitry 903 executes the operating system and the user applications to generate and consume user data. The CPU in user circuitry 903 executes the operating system and the network applications to wirelessly exchange corresponding signaling and data with LTE eNodeB 521 and 5GNR gNodeB 522 over radios 901 and 903.

In operation, the LTE RRC in UE 510 wirelessly attaches to LTE eNodeB 521 over antennas in LTE radio 901. The LTE RRC in UE 510 generates UL LTE signaling and UL LTE data. The UL signaling indicates 5G capabilities for UE 510. The LTE network applications in UE 510 process the UL LTE signaling and the UL LTE data to generate corresponding UL LTE symbols that carry the UL LTE signaling and UL LTE data. The LTE DSP in LTE radio 901 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5G UE capabilities) and UL LTE data for UE 510 to LTE eNodeB 521.

The LTE antennas in LTE radio 901 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates a B1 measurement object, APNs, QCIs, and network addresses from LTE eNodeB 521.

In response to the B1 measurement object, the LTE RRC in UE 510 directs the 5GNR PHY to measure 5GNR signal strength of the reference signal from 5GNR gNodeB 522. The 5GNR PHY reports the 5GNR signal strength to the LTE RRC. The LTE RRC in UE 510 transfers the 5GNR signal strength to LTE eNodeB 521. LTE eNodeB 521 determines a B1 addition threshold for 5GNR gNodeB 522 based on the frequency channel size for 5GNR gNodeB 522. LTE eNodeB 521 determines an inter-RAT addition value based on the 5GNR signal strength. When the inter-RAT addition value is greater than the B1 addition threshold, LTE eNodeB 521 directs the 5GNR PDCP in UE 510 to attach to 5GNR gNodeB 522. 5GNR gNodeB 522 exchanges user data for UE 510 with the 5GNR PDCP in UE 510.

LTE eNodeB 521 determines a B1 drop threshold for 5GNR gNodeB 522 based on the frequency channel size for 5GNR gNodeB 522. The LTE RRC in UE 510 directs the 5GNR PHY to measure subsequent 5GNR signal strength of reference signal from 5GNR gNodeB 522. The 5GNR PHY reports the subsequent signal strength to the LTE RRC. The LTE RRC in UE 510 wirelessly transfers the subsequent 5GNR signal strength to LTE eNodeB 521. LTE eNodeB 521 determines an inter-RAT drop value for 5GNR gNodeB 522 based on the subsequent 5GNR signal strength. When the inter-RAT drop value for 5GNR gNodeB 522 is lower than the B1 drop threshold for 5GNR gNodeB 522, LTE eNodeB 521 signals the 5GNR PDCP in UE 510 to detach from 5GNR gNodeB 522. The 5GNR PDCP in UE 510 detaches from 5GNR gNodeB 522.

Figure 10:
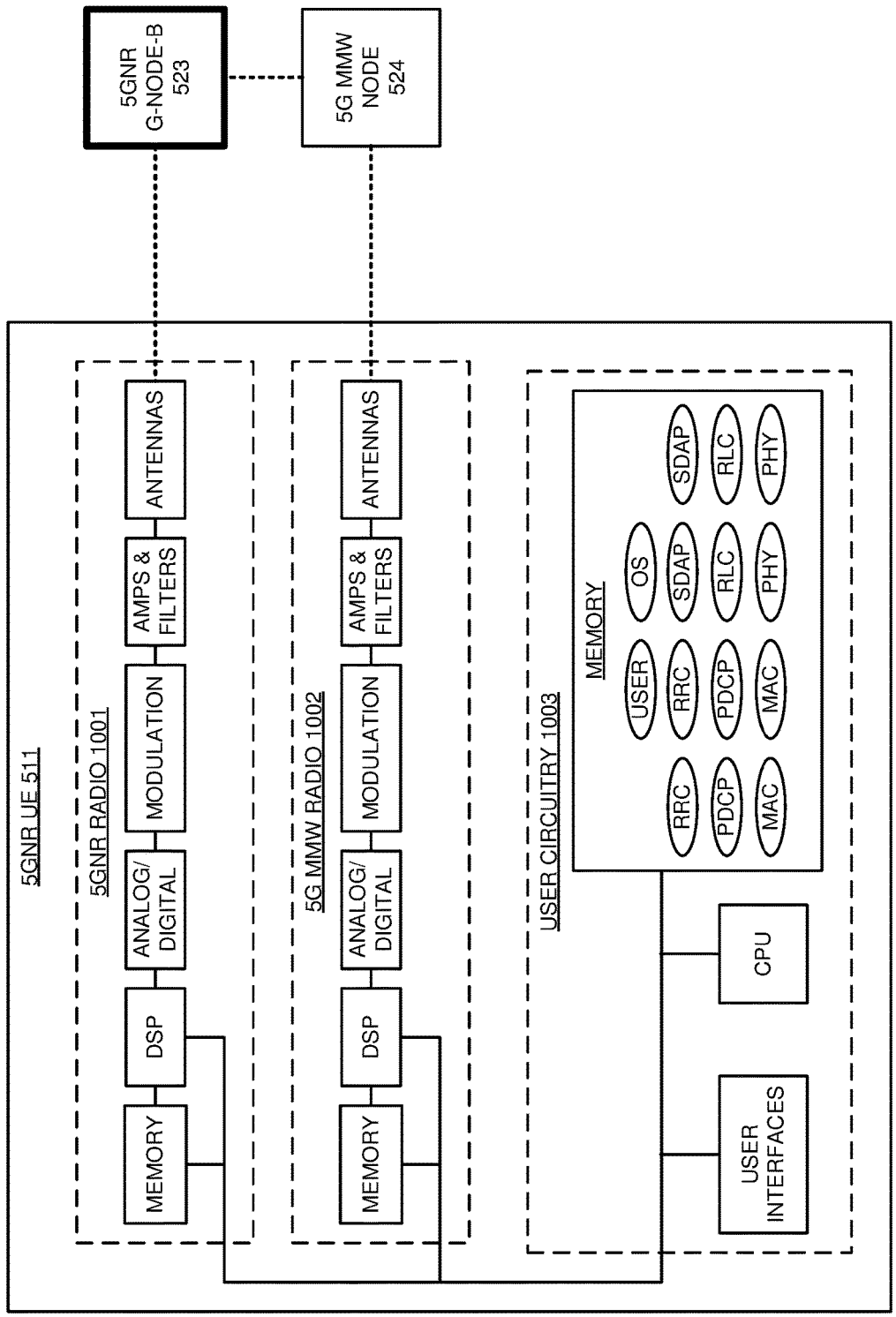
FIG. 10 illustrates the 5GNR UE that is served by the 5GNR gNodeB over multiple wireless links based on frequency channel size.

FIG. 10 illustrates 5GNR UE 511 that is served by 5GNR gNodeB 523 based on frequency channel size. 5GNR UE 511 is an example of UE 101, although UE 101 may differ. UE 511 comprises 5GNR radio 1001, 5G MMW radio 1002, and user circuitry 1003 that are coupled over bus circuitry. 5GNR radio 1001 and 5G MMW radio 1002 comprise antennas, amplifiers, filters, modulation, analog-to-digital interfaces, DSP, and memory that are coupled over bus circuitry. User circuitry 1003 comprises user interfaces, CPU, and memory that are coupled over bus circuitry. The antennas in 5GNR radio 1001 are wirelessly coupled to 5GNR gNodeB 523. The antennas in 5G MMW radio 1002 are wirelessly coupled to 5G MMW node 524. The user interfaces in user circuitry 1003 comprise graphic displays, machine controllers, sensors, cameras, transceivers, and/or some other user components. The memory in user circuitry 1003 stores an operating system, user applications, and network applications (PHY, MAC, RLC, PDCP, SDAP, and RRC). The CPU in user circuitry 1003 executes the operating system and the user applications to generate and consume user data. The CPU in user circuitry 1003 executes the operating system and the network applications to wirelessly exchange corresponding signaling and data with 5GNR gNodeB 523 over 5GNR radio 1001 and with 5G MMW node 524 over 5G MMW radio 1002.

In operation, the 5GNR RRC in UE 511 wirelessly attaches to 5GNR gNodeB 523 over antennas in 5GNR radio 1001. The 5GNR RRC generates 5GNR signals that transport UL 5GNR signaling and UL 5GNR data. The 5GNR signaling indicates 5G capabilities for UE 511. The 5GNR network applications in UE 511 process the UL 5GNR signaling and the UL 5GNR data to generate corresponding UL 5GNR symbols that carry the UL 5GNR signaling and UL 5GNR data. The 5GNR DSP in 5GNR radio 1001 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the 5G capabilities) and UL 5GNR data for UE 511 to 5GNR gNodeB 523.

The 5GNR antennas 5GNR radio 1001 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 511 execute the network applications to process the DL 5GNR symbols and recover the DL 5GNR signaling having the 5GNR measurement object, QoS levels, network addresses, and the like and the DL 5GNR data.

In response to the 5GNR measurement object, the 5GNR RRC in UE 511 directs the MMW PHY in UE 511 to measure MMW signal strength of the reference signal for 5G MMW node 524. The MMW PHY reports the signal strength to the 5GNR RRC. The 5GNR RRC wirelessly transfers a measurement report that characterizes the signal strength for 5G MMW node 524 to 5GNR gNodeB 523. 5GNR gNodeB 523 determines an inter-RAT add threshold for 5G MMW node 524 based on the frequency channel size of 5G MMW node 524. 5GNR gNodeB 523 determines an inter-RAT add value for 5G MMW node 524 based on the reported signal strength. When the inter-RAT addition value is greater than the inter-RAT addition threshold for 5G MMW node 524, 5GNR gNodeB 523 directs the MMW RRC in UE 511 to attach to 5G MMW node 524. The MMW RRC in 5GNR UE 511 attaches to 5G MMW node 524 over 5G MMW radio 902. 5G MMW node 524 exchanges user data with the MMW SDAP in UE 511 and MMW signaling with the MMW RRC in UE 511.

The 5GNR RRC in UE 511 directs the 5G MMW PHY in UE 511 to measure subsequent signal strength of the reference signal for 5G MMW node 524. The MMW PHYs report the subsequent MMW signal strength to the 5GNR RRC. The 5GNR RRC wirelessly transfers a measurement report that characterizes the subsequent signal strength to 5GNR gNodeB 523. When the drop value is lower than the drop threshold for MMW node 524, the 5GNR RRC in 5GNR gNodeB 523 signals the MMW RRC in UE 511 to detach from 5G MMW node 524. 5G MMW node 524 to stops exchanging the user data with UE 511.

Figure 11:
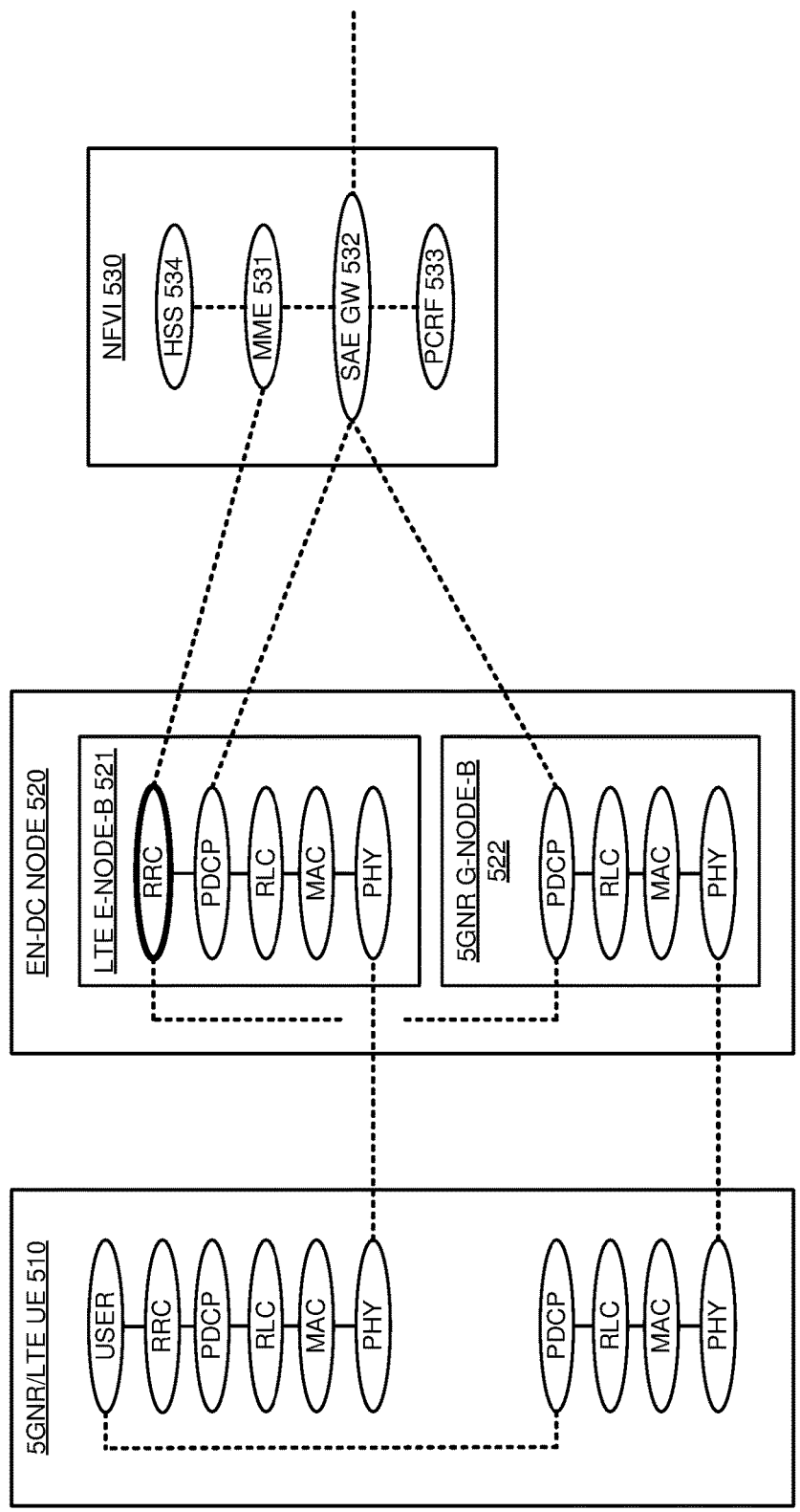
FIG. 11 illustrates an exemplary operation of the 5GNR/LTE UE, the EN-DC access node, and the NFVI to serve the 5GNR/LTE UE over multiple wireless links based on frequency channel size.

FIG. 11 illustrates an exemplary operation of 5GNR/LTE UE 510, EN-DC access node 520, and NFVI 530 to serve 5GNR/LTE UE 510 over multiple wireless links based on frequency channel size. In 5GNR/LTE UE 510, a user application requests data communication, and the LTE RRC in UE 510 attaches to the LTE RRC in LTE eNodeB 521 over the LTE PDCPs, RLCs, MACs, and PHYs. The LTE RRC in UE 510 indicates 5G capabilities for UE to the LTE RRC in LTE eNodeB 521. The LTE RRC in LTE eNodeB 521 transfers S1-MME signaling to MME 531 that requests data services and indicates the 5G capabilities for UE 510.

MME 531 interacts with HSS 534 to authenticate and authorize UE 510 for wireless data services by APNs. MME 531 generates a B1 measurement object for UE 510 in response to the 5G authorization and the 5G capabilities that specifies frequencies for UE 510 to measure when establishing duel connectivity. MME 531 transfers the APNs for UE 510 to SAE GW 532. SAE GW 532 interacts with PCRF 533 to select QCIs and network addresses for UE 510 based on the APNs. SAE GW 532 transfers the APNs, QCIs, and addresses to MME 531. MME 531 transfers the APNs, QCIs, network address, and the B1 measurement object for UE 510 to the LTE RRC in LTE eNodeB 521. The RRC in LTE eNodeB 521 transfers the APNs, QCIs, network address, and B1 measurement object to the LTE RRC in UE 510 over the PDCPs, RLCs, MACs, and PHYs. SAE GW 532 exchanges the user data with the PDCP in LTE eNodeB 521. The PDCP in LTE eNodeB 521 exchanges the user data with the LTE PDCP in UE 510 over the RLCs, MACs, and PHYs.

In response to the B1 measurement object, the LTE RRC in UE 510 directs the 5GNR PHY to measure 5GNR signal strength of the reference signal for 5GNR gNodeB 522. The 5GNR PHY reports the signal strength to the LTE RRC in UE 510. The LTE RRC in UE 510 transfers measurement report that characterizes the 5GNR signal strength to the LTE RRC in LTE eNodeB 521. The LTE RRC in LTE eNodeB 521 determines frequency offset and hysteresis for 5GNR gNodeB 522. The LTE RRC in LTE eNodeB 521 determines frequency channel size for 5GNR gNodeB 522. The LTE RRC in LTE eNodeB 521 determines a B1 addition threshold for 5GNR gNodeB 522 based on the frequency channel size for 5GNR gNodeB 522. The LTE RRC in LTE eNodeB 521 determines an inter-RAT addition value for 5GNR gNodeB 522 based on the 5GNR signal strength, the frequency offset, and the hysteresis. The LTE RRC in LTE eNodeB 521 determines when the inter-RAT addition value is greater than the B1 addition threshold. When the inter-RAT addition value for 5GNR gNodeB 522 is greater than the B1 addition threshold for 5GNR gNodeB 522, the LTE RRC in LTE eNodeB 521 directs the 5GNR PDCP in 5GNR gNodeB 522 to serve UE 510. The LTE RRC in eNodeB 521 directs the 5GNR PDCP in UE 510 to attach to the 5GNR PDCP in 5GNR gNodeB 522 over the 5GNR RLCs, MACs, and PHYs. The 5GNR PDCP attaches to the 5GNR PDCP in 5GNR gNodeB 522.

The PDCP in 5GNR gNodeB 522 requests 5GNR service for UE 510 from the LTE RRC in LTE eNodeB 521 over X2 signaling. The LTE RRC in LTE eNodeB 521 requests the 5GNR service for UE 510 from MME 531 over S1-MME signaling. MME 531 directs SAE GW 532 to serve UE 510 over 5GNR gNodeB 522. MME 531 transfers the APNs, QCIs, and network address for UE 510 to the RRC in LTE eNodeB 521. The LTE RRC in LTE eNodeB 521 transfers the APNs, QCIs, and network address to the 5GNR PDCP in 5GNR gNodeB 522 over X2 signaling. The PDCP in 5GNR gNodeB 522 transfers the APNs, QCIs, and network address to the PDCP in UE 510 over the RLCs, MACs, and PHYs. SAE GW 532 exchanges user data for UE 510 with external systems. SAE GW 531 exchanges the user data with the PDCP in 5GNR gNodeB 522. The 5GNR PDCP in 5GNR gNodeB 522 exchanges the user data with the 5GNR PDCP in UE 510 over the RLCs, MACs, and PHYs.

Figure 12:
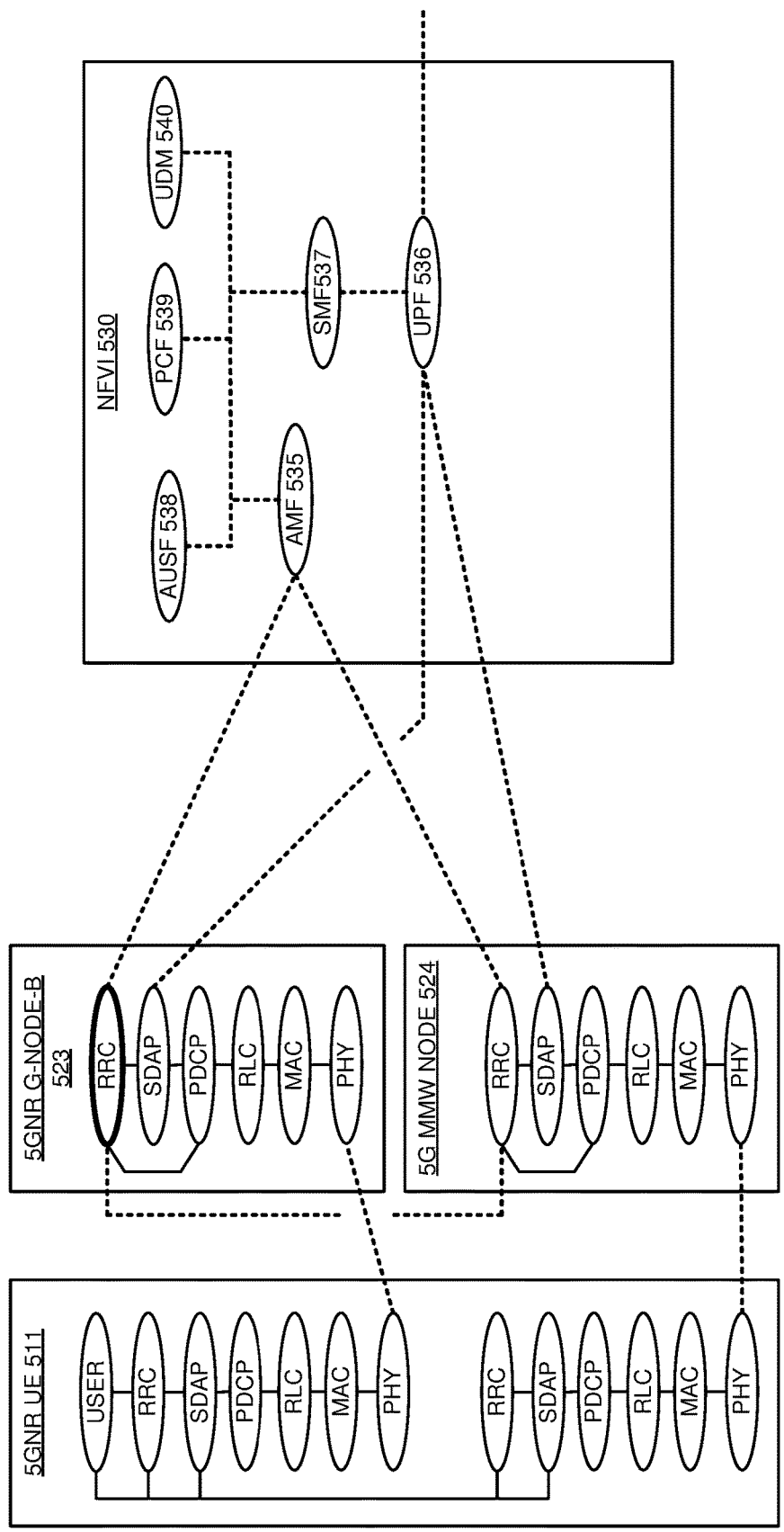
FIG. 12 illustrates an exemplary operation of the 5GNR UE, the 5GNR gNodeB, a 5G MMW access node, and the NFVI to serve the 5GNR UE over multiple wireless links based on frequency channel size.

The RRC in LTE eNodeB 521 determines a B1 drop threshold for 5GNR gNodeB 522 based on the frequency channel size of 5GNR gNodeB 522. The LTE RRC in UE 510 directs the 5GNR PHY to measure subsequent 5GNR signal strength. The PHY reports the signal strength to the LTE RRC in UE 510. The LTE RRC in UE 510 transfers the subsequent signal strength to the LTE RRC in LTE eNodeB 521 over the PDCPs, RLCs, MACs, and PHYs. The LTE RRC in LTE eNodeB 521 determines an inter-RAT drop value for 5GNR gNodeB 522 based on the subsequent 5GNR signal strength. The LTE RRC in LTE eNodeB 521 determines when the inter-RAT drop value is less than the B1 drop threshold. When the inter-RAT drop value is less than the B1 drop threshold, the LTE RRC in LTE eNodeB 521 directs the 5GNR PDCP in 5GNR gNodeB 522 to stop serving UE 510 and notifies MME 531. The LTE RRC in LTE eNodeB 521 directs the 5GNR PDCP in UE 510 to detach. UE 510 detaches from 5GNR gNodeB 522. MME 531 directs SAE GW 532 to stop serving UE 510 over 5GNR gNodeB 522. SAE GW 532 stops exchanging 5GNR data with the 5GNR PDCP in 5GNR gNodeB 522. The PDCP in 5GNR gNodeB 522 stops exchanging the data with the PDCP in UE 510 over the RLCs, MACs, and PHYs FIG. 12 illustrates an exemplary operation of UE 511, 5GNR gNodeB 523, 5G MMW node 524, and NFVI 530 to serve UE 511 over multiple wireless links based on frequency channel size. In 5GNR UE 511, a user application requests data communication, and the 5GNR RRCs in UE 511 attach to the 5GNR RRC in 5GNR gNodeB 523 over the 5GNR PDCPs, RLCs, MACs, and PHYs. The 5GNR RRC in UE 511 indicates 5G UE capabilities for the multiple types of 5G RAT to the 5GNR RRC in 5GNR gNodeB 523. The 5GNR RRC in 5GNR gNodeB 523 sends a request for data services for 5GNR UE 511 in N2 signaling to AMF 535 over the backhaul links. AMF 535 interacts with SMF 537, AUSF 538, PCF 539, UDM 540, and typically other functions to authenticate and authorize 5GNR UE 511 for 5G data services. SMF 537 directs UPF 536 to serve UE 511 per the quality-of-service metrics and network addressing. AMF 535 generates a 5GNR measurement object for UE 511 responsive to the 5G authorization and 5G UE capabilities that specifies frequencies for UE 511 to measure when establishing duel connectivity. AMF 535 transfers quality-of-service metrics, network addressing, and the 5GNR measurement object for UE 511 to the 5GNR RRC in 5GNR gNodeB 523 in N2 signaling. The 5GNR RRC in 5GNR gNodeB 523 transfers the selected APNs, QCIs, network addresses, and 5GNR measurement object to the 5GNR RRC in UE 511 over the PDCPs, RLCs, MACs, and PHYs.

In response to the 5GNR measurement object, the 5GNR RRC in UE 511 directs the MMW PHY to measure the signal strength for 5G MMW node 524. The MMW PHY reports the signal strength to the 5GNR RRC in UE 511. The 5GNR RRC generates a measurement report charactering the signal strength wirelessly transfers the measurement report to the 5GNR RRC in 5GNR gNodeB 523 over the PDCPs, RLCs, MACs, and PHYs. The 5GNR RRC in 5GNR gNodeB 523 determines the frequency offset, and the hysteresis for 5G MMW node 524.

The 5GNR RRC in 5GNR gNodeB 523 determines frequency channel size for 5G MMW node 524. The 5GNR RRC in 5GNR gNodeB 523 determines an inter-RAT addition threshold for 5G MMW node 524 based on the frequency channel size for 5G MMW node 524. The 5GNR RRC in 5GNR gNodeB 523 determines an inter-RAT addition value for 5G MMW node 524 based on the MMW signal strength. The 5GNR RRC in 5GNR gNodeB 523 determines when the inter-RAT addition value is greater than the inter-RAT addition threshold. When the 5GNR RRC in 5GNR gNodeB 523 determines the inter-RAT addition value is greater than the inter-RAT addition threshold for 5G MMW node 524, the 5GNR RRC in 5GNR gNodeB 523 directs the MMW RRC in 5G MMW node 524 to serve UE 511. The 5GNR RRC in 5GNR gNodeB 523 directs UE 511 to attach to 5G MMW node 524. The MMW RRC in UE 511 attaches to the RRC in 5G MMW node 524 over the PDCPs, RLCs, MACs, and PHYs. The MMW RRC in 5G MMW node 524 requests MMW service for UE 511 from AMF 535. UPF 536 exchanges user data for UE 511 with external systems. UPF 536 exchanges the user data with the SDAPs in 5G MMW node 524. The SDAPs in 5G MMW node 524 exchange the user data with the SDAPs in 5GNR UE 511 over the PDCPs, RLCs, MACs, and PHYs. The SDAPs in UE 511 exchange the user data with the user applications.

The 5GNR RRC in 5GNR gNodeB 523 determines an inter-RAT drop threshold for 5G MMW node 524 based on the frequency channel size for 5G MMW node 524. The 5GNR RRC in UE 511 directs the MMW PHY in UE 511 to measure subsequent signal strength for 5G MMW node 524. The MMW PHY reports the subsequent signal strength to the 5GNR RRC. The 5GNR RRC in UE 511 transfers the subsequent signal strength to the 5GNR RRC in 5GNR gNodeB 523. The 5GNR RRC in 5GNR gNodeB 523 determines an inter-RAT drop value for 5G MMW node 524 based on the subsequent signal strength. The 5GNR RRC in 5GNR gNodeB 523 determines when the inter-RAT drop value is less than the inter-RAT drop threshold. When the inter-RAT drop value for MMW node 524 is less than the inter-RAT drop threshold, the 5GNR RRC in 5GNR gNodeB 523 directs the MMW RRC in 5G MMW node 524 to stop serving UE 511 and directs the MMW RRC in UE 511 to detach from the MMW RRC in 5G MMW node 524. The RRC in 5G MMW node 524 stops exchanging the user data with the RRC in UE 511 over their PDCPs, RLCs, MACs, and PHYs.

The wireless data network circuitry described above comprises computer hardware and software that form special-purpose network circuitry to serve wireless UEs over multiple wireless links based on frequency channel size. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on frequency channel size.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a primary access node to add a secondary access node to deliver wireless communication service, the method comprising:

a radio wirelessly receiving a measurement report from a User Equipment (UE) characterizing a radio metric for the secondary access node and transferring the measurement report to baseband circuitry;

the baseband circuitry determining a frequency channel size for the secondary access node, determining an add threshold for the secondary access node based on the frequency channel size for the secondary access node, receiving and processing the measurement report and responsively determining an add value for the secondary access node based on the radio metric in the measurement report, and determining when the add value is greater than the add threshold;

when the add value is greater than the add threshold, the baseband circuitry transferring network signaling to the secondary access node to serve the UE and transferring user signaling for the UE to the radio; and the radio wirelessly transferring the user signaling to the UE to attach to the secondary access node, wherein the UE attaches to the secondary access node responsive to the user signaling and the secondary access node delivers the wireless communication service to the UE responsive to the network signaling.

2. The method of claim 1 further comprising the baseband circuitry determining a frequency channel interference for the secondary access node and wherein the baseband circuitry determining the add threshold comprises the baseband circuitry determining the add threshold based on the frequency channel size and the frequency channel interference.

3. The method of claim 1 further comprising the baseband circuitry determining an uplink noise rise for the secondary access node and wherein the baseband circuitry determining the add threshold comprises the baseband circuitry determining the add threshold based on the frequency channel size and the uplink noise rise.

4. The method of claim 1 further comprising the baseband circuitry determining an amount of UEs served by the secondary access node and wherein the baseband circuitry determining the add threshold comprises the baseband circuitry determining the add threshold based on the frequency channel size and the amount of UEs served by the secondary access node.

5. The method of claim 1 further comprising the baseband circuitry determining a frequency band call drop rate for the secondary access node and wherein the baseband circuitry determining the add threshold comprises the baseband circuitry determining the add threshold based on the frequency channel size and the frequency band call drop rate.

6. The method of claim 1 further comprising the baseband circuitry determining a frequency band call fail rate for the secondary access node and wherein the baseband circuitry determining the add threshold comprises the baseband circuitry determining the add threshold based on the frequency channel size and the frequency band call fail rate.

7. The method of claim 1 further comprising the baseband circuitry determining a frequency band path loss for the secondary access node and wherein the baseband circuitry determining the add threshold comprises the baseband circuitry determining the add threshold based on the frequency channel size and the frequency band path loss.

8. The method of claim 1 further comprising the baseband circuitry determining a frequency band fading for the secondary access node and wherein the baseband circuitry determining the add threshold comprises the baseband circuitry determining the add threshold based on the frequency channel size and the frequency band fading.

9. The method of claim 1 further comprising the baseband circuitry determining an uplink toggle rate for the secondary access node and wherein the baseband circuitry determining the add threshold comprises the baseband circuitry determining the add threshold based on the frequency channel size and the uplink toggle rate.

10. The method of claim 1 wherein the primary access node comprises a Fifth Generation New Radio (5GNR) gNodeB and the secondary access node comprises a Millimeter Wave (MMW) access node.

11. A primary access node configured to add a secondary access node to deliver wireless communication service, the primary access node comprising:
 a radio configured to wirelessly receive a measurement report from a User Equipment (UE) characterizing a radio metric for the secondary access node and transfer the measurement report to baseband circuitry;
 the baseband circuitry configured to determine a frequency channel size for the secondary access node, determine an add threshold for the secondary access node based on the frequency channel size for the secondary access node, receive and process the measurement report and responsively determine an add value for the secondary access node based on the radio metric in the measurement report, and determine when the add value is greater than the add threshold;
 when the add value is greater than the add threshold, the baseband circuitry configured to transfer network signaling to the secondary access node to serve the UE and transfer user signaling for the UE to the radio; and
 the radio configured to wirelessly transfer the user signaling to the UE to attach to the secondary access node, wherein the UE attaches to the secondary access node responsive to the user signaling and the secondary access node delivers the wireless communication service to the UE responsive to the network signaling.

12. The primary access node of claim 11 further comprising the baseband circuitry configured to determine a frequency channel interference for the secondary access node and wherein the baseband circuitry configured to determine the add threshold comprises the baseband circuitry configured to determine the add threshold based on the frequency channel size and the frequency channel interference.

13. The primary access node of claim 11 further comprising the baseband circuitry configured to determine an uplink noise rise for the secondary access node and wherein the baseband circuitry configured to determine the add threshold comprises the baseband circuitry configured to determine the add threshold based on the frequency channel size and the uplink noise rise.

14. The primary access node of claim 11 further comprising the baseband circuitry configured to determine an amount of UEs served by the secondary access node and wherein the baseband circuitry configured to determine the add threshold comprises the baseband circuitry configured to determine the add threshold based on the frequency channel size and the amount of UEs served by the secondary access node.

15. The primary access node of claim 11 further comprising the baseband circuitry configured to determine a frequency band call drop rate for the secondary access node and wherein the baseband circuitry configured to determine the add threshold comprises the baseband circuitry configured to determine the add threshold based on the frequency channel size and the frequency band call drop rate.

16. The primary access node of claim 11 further comprising the baseband circuitry configured to determine a frequency band call fail rate for the secondary access node and wherein the baseband circuitry configured to determine the add threshold comprises the baseband circuitry configured to determine the add threshold based on the frequency channel size and the frequency band call fail rate.

17. The primary access node of claim 11 further comprising the baseband circuitry configured to determine a frequency band path loss for the secondary access node and wherein the baseband circuitry configured to determine the add threshold comprises the baseband circuitry configured to determine the add threshold based on the frequency channel size and the frequency band path loss.

18. The primary access node of claim 11 further comprising the baseband circuitry configured to determine a frequency band fading for the secondary access node and wherein the baseband circuitry configured to determine the add threshold comprises the baseband circuitry configured to determine the add threshold based on the frequency channel size and the frequency band fading.

19. The primary access node of claim 11 further comprising the baseband circuitry configured to determine an uplink toggle rate for the secondary access node and wherein the baseband circuitry configured to determine the add threshold comprises the baseband circuitry configured to determine the add threshold based on the frequency channel size and the uplink toggle rate.

20. The primary access node of claim 11 wherein the primary access node comprises a Fifth Generation New Radio (5GNR) gNodeB and the secondary access node comprises a Millimeter Wave (MMW) access node.

* * * * *